United States Patent
Agonia et al.

(10) Patent No.: US 10,744,916 B2
(45) Date of Patent: Aug. 18, 2020

(54) STOP CLIP ASSEMBLY FOR UPHOLSTERY LISTING

(71) Applicant: Hope Global, Division of NFA Corp., Cumberland, RI (US)

(72) Inventors: Jeffrey A. Agonia, Lincoln, RI (US); Aleksandr V. Boguk, North Providence, RI (US); Carlos A. Neves, Cumberland, RI (US); Andrew W. Santin, Beverly, MA (US)

(73) Assignee: Hope Global, Division of NFA Corp., Cumberland, RI (US)

( * ) Notice: Subject to any disclaimer, the term of this patent is extended or adjusted under 35 U.S.C. 154(b) by 60 days.

(21) Appl. No.: 15/891,309

(22) Filed: Feb. 7, 2018

(65) Prior Publication Data

US 2018/0236915 A1 Aug. 23, 2018

Related U.S. Application Data

(60) Provisional application No. 62/455,894, filed on Feb. 7, 2017.

(51) Int. Cl.
*B60N 2/60* (2006.01)
*B60N 2/58* (2006.01)
*F16B 21/07* (2006.01)
*F16B 2/22* (2006.01)

(52) U.S. Cl.
CPC .......... *B60N 2/5825* (2013.01); *F16B 21/073* (2013.01); *B60N 2/6027* (2013.01); *F16B 2/22* (2013.01); *Y10T 24/309* (2015.01); *Y10T 24/45105* (2015.01)

(58) Field of Classification Search
CPC ............. Y10T 24/45105; Y10T 24/309; F16B 21/073; B60N 2/5825; B60N 2/6027; B60N 2/6036
USPC ...................................................... 297/218.2
See application file for complete search history.

(56) References Cited

U.S. PATENT DOCUMENTS

| 7,444,792 | B2 * | 11/2008 | Matson ................... E04D 12/00 24/336 |
| 8,099,837 | B2 | 1/2012 | Santin et al. |
| 8,857,018 | B2 * | 10/2014 | Murasaki ............. A47C 31/023 24/297 |
| 9,834,431 | B2 * | 12/2017 | Agonia ................ B60N 2/5825 |
| 10,398,629 | B1 * | 9/2019 | Spironello ........ A61M 16/0497 |

(Continued)

FOREIGN PATENT DOCUMENTS

JP 2011045424 A 3/2011

*Primary Examiner* — Syed A Islam
(74) *Attorney, Agent, or Firm* — Loginov & Associates, PLLC; William A. Loginov

(57) ABSTRACT

This invention provides a locking seat cover securing system that includes a listing bead with a notch removed from the bead, and a stop clip with a nub in an inner surface of the stop clip. The notch is curved so as to maintain the structural integrity of the listing bead. The nub is sized, shaped, and located to correspond to the notch on the listing bead, so that the nub can engage within the listing bead when the listing bead is inserted into the notch. The engagement of the nub within the notch prevents the listing bead from sliding within the locking stop clip. The listing bead with the stop clip can be inserted into an upholstery clip within a foam seat, and the stop clip can abut the upholstery clip so that the listing bead cannot move relative to the upholstery clip.

20 Claims, 28 Drawing Sheets

(56) References Cited

U.S. PATENT DOCUMENTS

| | | | |
|---|---|---|---|
| 10,448,743 B2* | 10/2019 | Saiga | F16B 2/22 |
| 2003/0162008 A1* | 8/2003 | Cappucci | B29C 44/1271 |
| | | | 428/304.4 |
| 2003/0215601 A1* | 11/2003 | Pedde | B29C 33/12 |
| | | | 428/102 |
| 2005/0006944 A1* | 1/2005 | Ali | B60N 2/5825 |
| | | | 297/452.6 |
| 2005/0155191 A1* | 7/2005 | Asano | B60R 13/0206 |
| | | | 24/297 |
| 2009/0140569 A1 | 6/2009 | Mashimo | |
| 2011/0309667 A1 | 12/2011 | Stiller et al. | |
| 2012/0174352 A1 | 7/2012 | Tsunoda | |
| 2012/0284974 A1 | 11/2012 | Yamamoto et al. | |
| 2013/0247338 A1 | 9/2013 | Santin et al. | |
| 2015/0135485 A1 | 5/2015 | Santin et al. | |
| 2016/0167554 A1 | 6/2016 | Murasaki et al. | |
| 2016/0249746 A1 | 9/2016 | Saiga et al. | |
| 2016/0280105 A1 | 9/2016 | Sato et al. | |
| 2017/0305316 A1* | 10/2017 | Lafferty | B60N 2/5825 |

* cited by examiner

STOP CLIP ASSEMBLY FOR UPHOLSTERY LISTING

RELATED APPLICATION

This application claims the benefit of U.S. Provisional Application Ser. No. 62/455,894, entitled STOP CLIP ASSEMBLY FOR UPHOLSTERY LISTING, filed Feb. 7, 2017, the teachings of which are incorporated herein by reference.

FIELD OF THE INVENTION

This invention relates to trim and upholstery attachment mechanisms, and more particularly to systems for attaching trim and upholstery to foam and other resilient or flexible substrates using clips that can be engaged with listing beads, wire inserts and/or foam seats.

BACKGROUND OF THE INVENTION

Modern fabric trim covers and their interconnected spring and cushion components (collectively termed "upholstery"), such as those used in vehicles, are often carefully sculpted and shaped to produce a comfortable and aesthetically pleasing effect. As such, the fabric (typically cloth, vinyl or leather with an appropriate backing material) is secured at many locations along its surface to a resilient or flexible backing that defines the cushioned substrate of the upholstered item (for example, a seat bottom, cushion, back or headrest). In general, the close-fitting appearance of the upholstery to the substrate requires that the fabric be tacked down to the substrate at any intermediate surface contour dips, Vees or trenches in the surface. Otherwise, the fabric will tend to billow out or "tent" at these non-planar surface features.

One approach to efficiently and securely attach trim covers to a foam substrate involves the use of resilient polymer trim clips that are embedded in, and adhered to, the foam. With reference FIG. 1, an example of an upholstery clip 100 is shown embedded in a foam substrate 102. The upholstery clip 100 resides within a trench 104 formed in the substrate 102. The clip 100 in this example is a low-profile clip as described in commonly assigned U.S. Pat. No. 8,099,837, entitled LOW-PROFILE UPHOLSTERY CLIP FOR ATTACHING A BEAD TO A FOAM SUBSTRATE, the teachings of which are incorporated herein by reference as useful background information. This exemplary clip 100 includes a planar (flat) rectangular base 110 and an upwardly directed clip member 150 with associated legs 160, and inwardly and downwardly directed barbs 170 adapted to capture a listing bead through a gap 180 therebetween, as described below.

The clip base 110 in this example includes formations 112 and 114 on opposing ends, which are optional and allow for a "festooning" arrangement, wherein clips can be snapped together in a variable-length, flexible chain during storage and distribution by engaging each cylindrical formation 114 with an overlying C-formation 112 on an adjacent clip. Versions of these festooning clips are described in commonly assigned U.S. patent application Ser. No. 13/787,929, entitled FESTOONED TRIM CLIP SYSTEM AND METHOD FOR ATTACHING FESTOONED CLIPS TO A SUBSTRATE, the teachings of which are incorporated herein by reference. Before foam is injected into a mold cavity, the installer peels each clip off of the chain by removing the cylinder formation 114 from an adjacent C-formation 112, and applies it to an appropriate location (e.g. along a trench) within mold cavity. In alternate embodiments, a clip base can have a key on the bottom that can be fit into a corresponding slot on a hard anchor base so that the clip can be turned and locked into place, as described in commonly assigned U.S. patent application Ser. No. 14/534,104 entitled UPHOLSTERY CLIP FOR REMOVABLE ATTACHMENT TO RIGID SURFACES, the teachings of which are incorporated herein by reference. Other embodiments of clip bases, such as hooks on the bottom of the clip, or other arrangements for securing the clip in place, will be understood by a person having ordinary skill in the art.

FIGS. 2 and 3 show the installation of a typical, prior art listing bead 210 into a low-profile clip in accordance with this embodiment. In FIG. 2, the listing bead 210 is attached at the end of a web 220 (a fabric), which is, itself, attached to an overlying upholstery piece (not shown). The exemplary listing bead 210 can be formed as a continuous extrusion from an acceptable polymer, and includes a pair of upper walls 230 that are defined at an approximate angle AW with respect to the horizontal line 231. The bead upper walls 230 are arranged to engage the bottom faces 232 of the barbs 170. During assembly, the listing is driven downwardly (arrow 250) toward the gap 180 between the clip member legs/barbs. The maximum width WGB of the listing bead 210 is wider than the width of the gap 180 when the legs are in a resting (unsprung) arrangement. Thus, the listing bead 210 can deform slightly as its rounded lower faces 260 pass through the barbs 170, and the reduced thickness legs 160 flex outwardly (outward arrows 227) in response to the pressure applied by the bead 210 as it engages the rounded ends of the barbs 170.

In FIG. 3, the bead 210 has passed fully through the gap 180 and is now resting (bottomed-out) against the base 110. So long as the central region of the clip is high enough to allow the upper walls 230 of the bead 210 to clear the bottom faces 232 of the barbs 170, then the clip legs 160 are allowed to flex back (inward arrows 320) into their original resting (unsprung) shape. After installation, the natural tension placed upon the attached upholstery covering will generally bias the upper walls 230 of the listing bead into firm engagement with the bottom faces 232 of the barbs 170. This tension, and the relatively close conformance of widths of the clip central region and bead (as shown in FIG. 3), ensures a rattle-free interconnection between the foam substrate and trim cover.

While the above-described, exemplary clip and listing arrangement provides an efficient and reliable mechanism for joining trim covers to foam substrates, it allows the listing bead to slide longitudinally within the clip. After installation, the clip holds the listing bead in two dimensions, but relies on limited friction between the bead and the insides of the legs to limit movement of the bead longitudinally within the clip. This longitudinal movement of the listing bead can affect the appearance of the entire seat trim cover. Accordingly, it is desirable to secure the listing bead and upholstery clip in all three dimensions relative to each other to securely hold the listing bead, and thus the seat cover, in place.

SUMMARY OF THE INVENTION

This invention overcomes disadvantages of the prior art by providing a stop clip and listing bead that can secure upholstery trim covers against movement with respect to the underlying foam cushion in a number of dimensions/direction, including inward and outward, upward and downward, and significantly, left-to-right and front-to-back—rendering the trim cover fully stationary with respect to the cushion. In an illustrative embodiment, a listing bead can have at least one notch in the bead, and a stop clip can have a nub extending from an inner surface of the clip, so that the nub can engage with the notch when the clip is engaged with the listing bead, thereby preventing the listing bead from moving in a longitudinal direction within the stop clip. The listing bead with the attached stop clip can be engaged with a clip embedded within the seat, and the stop clip can prevent the listing bead from moving in a longitudinal direction within the embedded clip, because the stop clip attached to the listing bead can abut the embedded clip to prevent the listing bead from sliding.

This invention can further provide a hook, or catch, on the bottom of the stop clip that can be used to engage with an embedded structure within the foam, such as a support wire. A seat can have a wire or other support structure embedded within the foam, and the stop clip can have a hook extending from the base of the clip, so that the hook can engage with the support wire, thereby securing the listing bead of the upholstery to the foam of the seat.

These novel clip structures and listing engagement systems effectively replaces a hook and loop, sewn tab or hog ring connections between the upholstery and cushion in the truest functional sense, and in a manner that affords substantial labor (and therefore, cost) saving. The arrangement also benefits aid users/installer by minimizing potential injury from repetitive stress-based ailments, such as carpal tunnel syndrome, and the like.

In an illustrative embodiment, a seat cover securing system includes a listing bead with a curved notch defined by a notch surface, and a stop clip with a base, two legs extending upwards from the base with barbs at a top region of the legs, and a nub extending upwards from the base, wherein the nub has a curved upper engagement surface that corresponds to, and nestles within the notch surface. The notch surface can be a portion of a circle or other curved/curvilinear cross-sectional shape. The notch surface can be a semicircle. The nub can be in the shape of a portion of a disc, or cylinder, or be a continuous full length lineal protrusion form the base, and the notch can be sized and shaped to accommodate the nub. The nub can be in the shape of a half disc, and the notch can be sized and shaped to accommodate the nub. A nub gap can be defined by a side of the nub, a portion of the base, and the leg.

In an illustrative embodiment, a locking listing bead assembly can include a web and a bead engaged with and affixed to the web, wherein the bead has at least one notch that is defined by a notch surface in the bead, and wherein the notch surface is curved and is free of corners or edges. The notch surface can be a portion of a circle. The notch surface can be a semicircle.

In an illustrative embodiment, a locking stop clip can include a base, a pair of legs extending upwards from the base, a barb at an end region of each leg, wherein the base, the legs, and the barbs partially define a central cavity, and a nub extending from the clip into the central cavity. The nub can have an upper surface that is a curved plane. The nub can be in the shape of a portion of a disc. The nub can extend upwards from the base, and the nub and the leg can define a nub gap between the nub and the leg, whereby the nub and the leg are free of contact between the nub and the leg. The nub can be in the shape of a portion of a disc. The nub can extend upwards from the base, and the nub and the leg can define a nub gap between the nub and the leg, whereby the nub and the leg are free of contact between the nub and the leg. The nub can have an upper surface that is a curved plane that touches the base at two opposite ends of the curved plane. The nub can have at least one nub side. A top portion of the nub does not contact the legs.

In an illustrative embodiment, an upholstery clip can include a base, first and second legs extending upwards from the base, a barb at an end region of each leg, wherein the base, the legs, and the barbs partially define a central cavity, and a catch extending downwards from a corner between the first leg and the base. The catch can include a support arm that can extend downward from the corner between the first leg and the base, and the catch can includes a holding arm that extends upwards from a lower region of the support arm towards the second leg. The catch can include a joint between the holding arm and the support arm, and the catch arm and the holding arm can be at an acute angle relative to each other. The joint can include a strengthening knuckle. The joint can include a spring area that is an area of reduced thickness of the catch. The spring area can be a channel within the joint that can extend from a front area of the clip to a rear area of the clip. The support arm can extend downward around a radius. The holding arm can be thickest at the distal end. The clip can have a lock that can extend down from the corner between the second leg and the base, wherein the lock can extend towards an end portion of the holding arm. The lock and the catch can define a cleft between the lock and the catch, and the cleft can be a passageway between a holding area within the clip and the outside of the clip. The holding area can be adapted to hold a support wire within a seat, and the cleft can be adapted to be narrower than the support wire. The lock can include a support arm that extends downward from the corner between the second leg and the base, and the lock can include a locking arm that can extend upwards from a lower region of the support arm towards the holding arm. The catch can have a shoulder extending outwards where the catch connects to the corner between the base and the first leg.

BRIEF DESCRIPTION OF THE DRAWINGS

The invention description below refers to the accompanying drawings, of which.

DETAILED DESCRIPTION

I. Stop Clip Construction and Use

Figure 1:
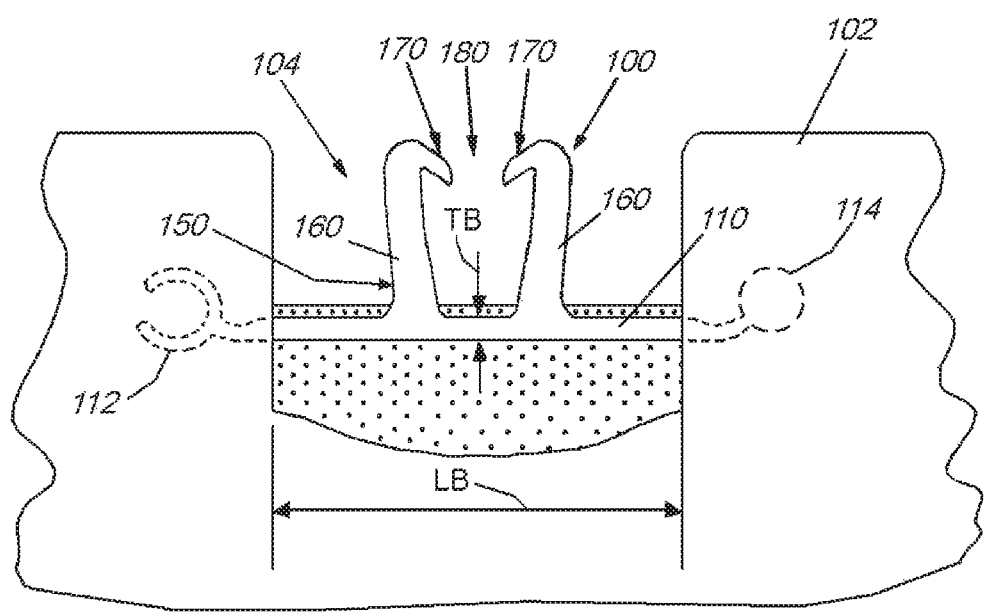
FIG. 1, already described, is a partially exposed side view of a foam substrate in the region of a trough containing an embedded upholstery clip for use in conjunction with a listing bead, as described in the background.
Figure 2:
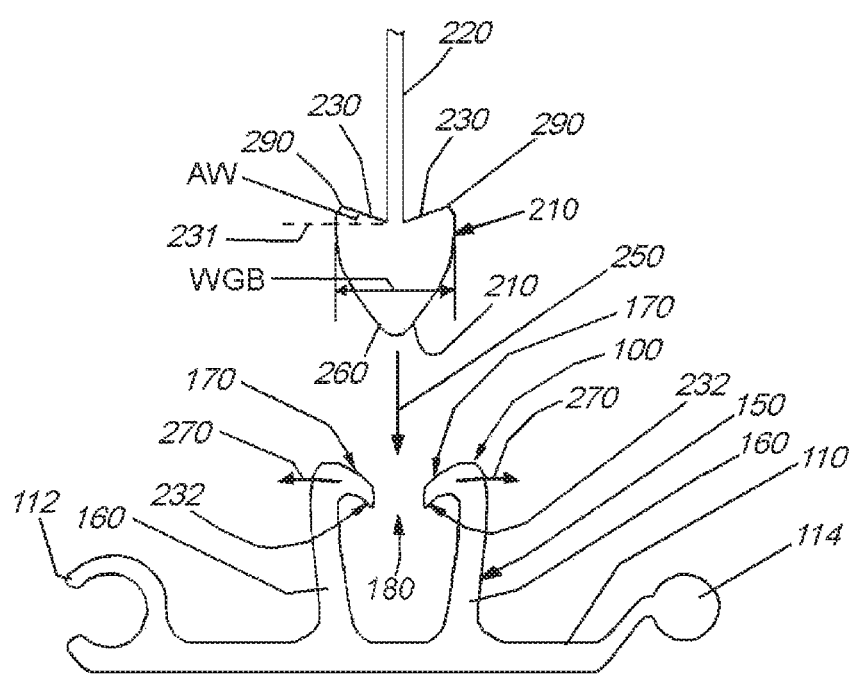
FIG. 2, already described, is a side view of the illustrative clip of FIG. 1 showing the insertion thereinto an of exemplary listing of an upholstery piece, as described in the background.
Figure 3:
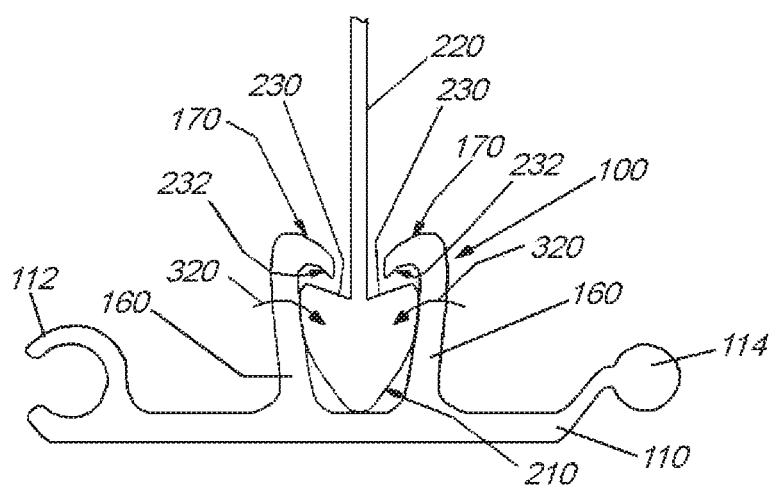
FIG. 3, already described, is a side view of the resulting interconnection of the clip and listing as shown in FIG. 2, as described in the background.
Figure 4:
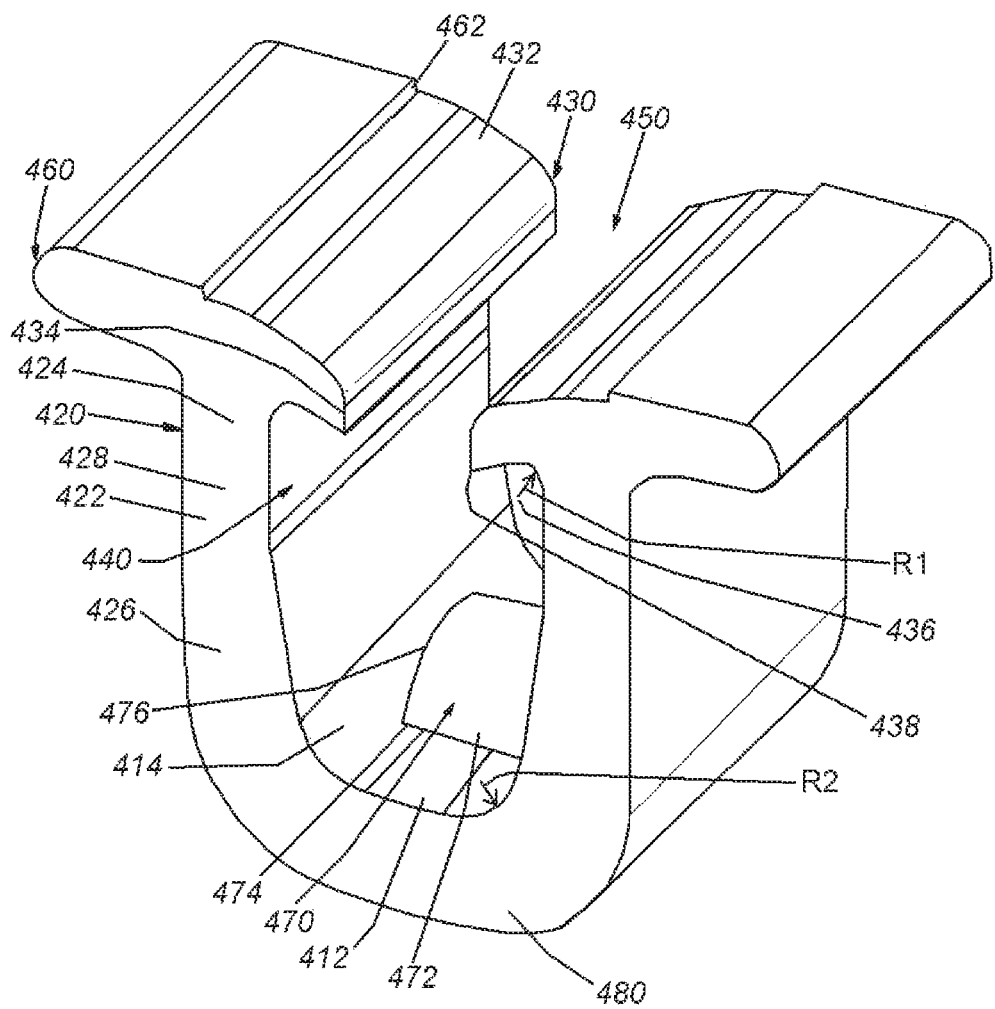
FIG. 4 is a perspective view of an exemplary stop clip with an inner nub, according to an embodiment.

FIG. 4 is a perspective view of an exemplary stop clip with an inner nub, according to an embodiment. An exemplary stop clip 400 can include an inner stop nub 470, and the inner nub 470 can engage with a notch on an upholstery listing bead. The engagement of the inner nub 470 within the notch can prevent the stop clip from moving along the length of the upholstery listing bead. The clip 400 can be attached to an upholstery listing, and the upholstery listing can be attached to a seat cover assembly. The upholstery listing with the stop clip 400 can then be engaged with an upholstery clip embedded within a foam seat, thereby securing the seat cover assembly to the foam seat. The stop clip 400 can be next to the embedded clip, so that the stop clip 400 can prevent the listing bead from moving laterally within the embedded clip. A single stop clip can prevent the listing bead from moving in one direction within the embedded clip, so that the cover can withstand forces exerted on it during use of the seat. The stop clip can be used to prevent the cover from moving relative to the underlying foam seat in one or more areas of the seat. By way of non-limiting example, a stop clip positioned on a listing bead above an embedded clip in the back of a seat can allow the cover to resist a downward force on the portion of the cover over the back of a seat as a user sits against the back of the seat. In an embodiment, two stop clips can be positioned on the listing bead and engaged with notches on either side of an embedded clip to prevent the listing bead from moving in either direction relative to the embedded clip in the foam seat.

The exemplary stop clip (referred to also as "clip") 400 can include a floor 410, legs 420, and barbs 430. The floor 410, legs 420, and barbs 430 can define a cavity 440. The floor 410 can be the upper part of a base of the clip 480. In various embodiments, the base 480 can include, or be a part of, various additional structures, explained more fully below. Legs 420 can have a thigh 422 and a calf 424. The thigh 422 can be tapered from a thicker region at the lower thigh 426 to a thinner region at the upper thigh 428. The calf 424 can be of uniform thickness (free of taper) between the upper thigh 428 and the barb 430. Note that the above-described geometric relationships and dimensions for the barbs, floor and legs are exemplary of a wide range of possible shapes and dimensions.

The two barbs 430 can define a gap 450 between the two barbs 430, so that a listing can pass between the barbs 430, through the gap 450, and into the cavity 440. Barbs 430 can be directed inwardly and downwardly to capture a listing. A barb 430 can have a slide 432 at the top of the barb. The slide 432 can be angled downwards and inwards towards the gap 450, so that a listing can slide down the slide 432 and into the gap 450. A barb can have a barb face 434 at the inner most portion of the barb 430. A barb 430 can have a bottom face 436 and a hook 438. Bottom face 436 and hook 438 can engage with the listing and hold the listing within the cavity. The bottom face 436 can be angled inward and downward to capture the listing and prevent the listing from being pulled out. A hook 438 can be a corner between the inner portion of the bottom face 436 and the lower portion of the barb face 434. The hook 438 can make contact with the top of the listing after the listing has been inserted into the cavity 440, thereby preventing the listing from being pulled out of the cavity 440. There can be an inner radius R1 between the bottom face 436 and the leg 420. The inner radius can strengthen the union of the barb 430 and the leg 420, as compared to a union with a sharp inner corner. The inner radius R1 can be approximately 0.38 millimeter+/−0.15 millimeter.

The floor 410 can have a central region 412 and curved floor sides 414. The central region 412 can be flat. The curved floor sides 414 can be curved upwards to meet the lower thigh 424. The clip 400 can have a floor radius R2 between the floor 410 and the leg 420. The floor radius R2 can be approximately 0.76 millimeter+/−0.15 millimeter.

The clip 400 can have extensions 460 that extend outwardly from the top corners of the clip 400. The top of the extension 460 can be approximately horizontal, or parallel with the floor 410. An extension 460 can have an extension face 462 between the top of the extension and the slide. The extension face 462 can be approximately vertical.

The clip 400 has a nub 470 extending into the cavity 440. Nub 470 can engage with a corresponding notch in a listing (not shown). Essentially, the nub can be shaped such that it prohibits movement of the stop clip on the beaded profile when the nub is engaged with a notch on the beaded profile. The nub 470 can have an engaging surface 472 on the outside of the nub 470. The nub 470 can be in the shape of a portion of a disc, or cylinder, and the engagement surface 472 can be the outer circumference of the partial disc or cylinder. The engagement surface 472 can be a curved plane. The engaging surface 472 can nestle into the notch, thereby engaging the listing and preventing the listing from sliding within the clip 400.

The nub 470 can have two engaging surface unions 474 where the engaging surface 472 meets the floor 410. The engaging surface unions 474 can be parallel. The engaging surface can have two rims 476 along the two edges of the engaging surface 472. Rims 476 can be parallel to each other, on either side of the engaging surface 472. The engaging surface can extend from one engaging surface union 474 to the other engaging surface union 474 with parallel rims along the side. The nub 470 is pictured as being located on the floor 410 of the clip 400 and extending into the cavity 440, however the nub could be located on a leg 420 or a barb 430 and extend into the cavity 440.

Since listing is often a commercially predetermined shape, the clips central region/interior space between the base and barbs must be roomy enough to allow the listing to fully push through the gap, as described below, and become secured against the bottom faces of the barbs. Hence, in this embodiment, the flattened barb bottom faces are oriented at a specific angle AB between approximately 20 to 35 degrees with an illustrative value of 29 degrees, which approximately matches that of the top, barb-engaging walls of the listing bead. In general, the depicted design allows for a desirable pullout-to-push-in performance. Clip 400 can be manufactured by injection molding, as will be understood by one skilled in the art, or by any other technique that lends itself to the geometry of the particular clip.

Figure 5A:
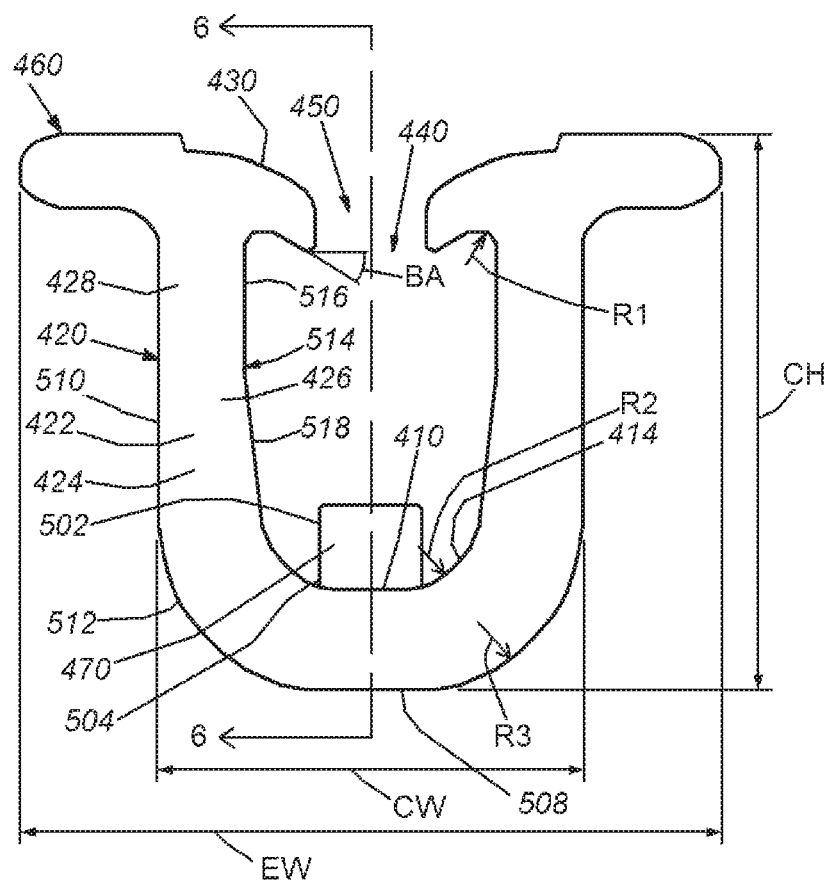
FIG. 5A is a side view of an exemplary stop clip with an inner nub, according to an embodiment.
Figure 5B:
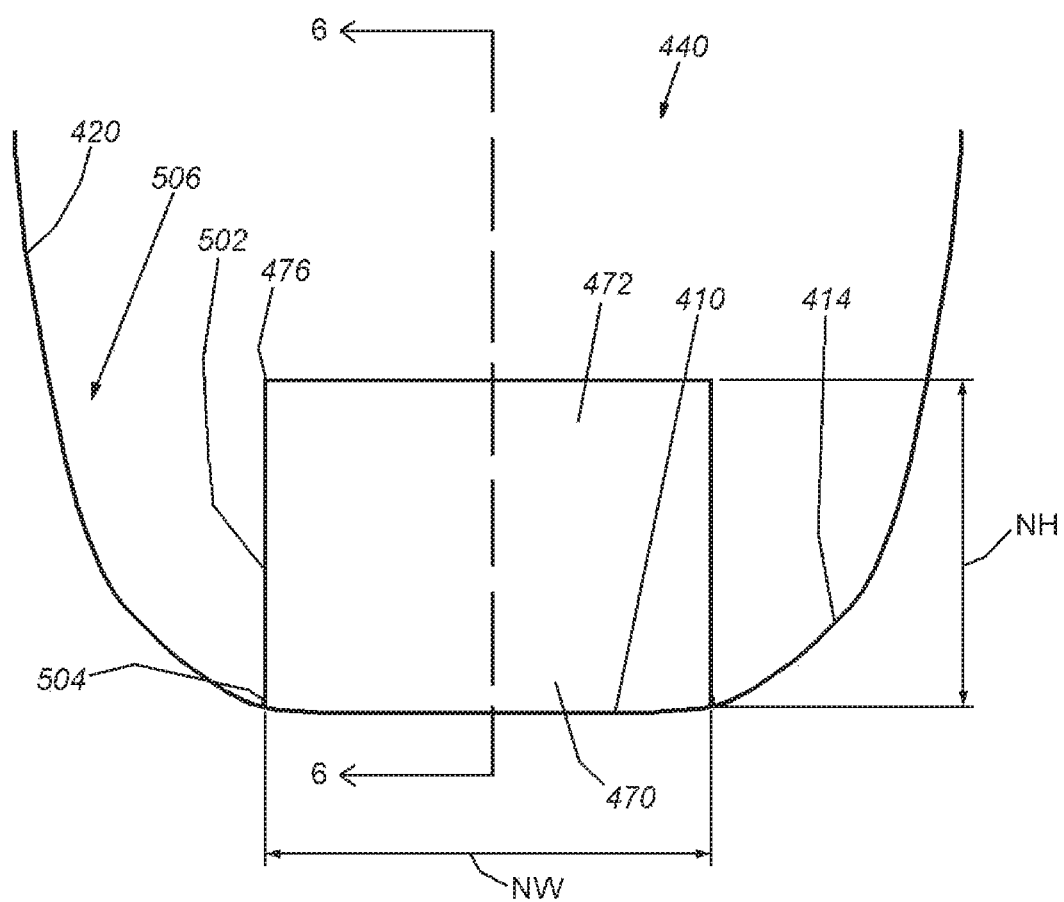
FIG. 5B is an view of the inner nub of FIG. 5A, according to an embodiment.

FIG. 5A is a side view of an exemplary stop clip with an inner nub, according to an embodiment. The nub 470 is shown extending upwards from the floor 410 into the cavity 440. FIG. 5B is a detailed view of the nub of FIG. 5A, according to the embodiment. The nub 470 can have nub sides 502. Referring to FIGS. 4 and 5B, nub sides 502 can meet the engagement surface 472 at the rim 476. The nub sides 502 can be perpendicular to the engagement surface 472. The nub can be shaped such that it prohibits movement of the stop clip on the beaded profile when the nub is engaged with a notch on the beaded profile. The nub 470 can be in the shape of a portion of a disc, or cylinder, engagement surface 472 can be the outer circumference of the partial disc, and nub sides 502 can be the planar surfaces that form the ends of the disc. Nub sides 502 can extend upwards from the floor 410, and can be approximately vertical. The nub sides 502 can extend upwards from the floor 410 at side unions 504. A side union 504 can be a corner between the nub side 502 and the floor 410. In an embodiment, the nub sides 502 do not contact the legs 420. The curved floor sides 414 can separate the nub sides 502 from the legs 420. There can be a nub gap 506 between the nub sides 502 and the legs 420. A nub gap 506 can be partially defined by a nub side 502 and a leg 420. A nub gap 506 can be partially defined by a nub side 502, a curved side floor 414 or a part of the clip base, and a leg 420.

A side union 504 can have a fillet between the nub side 502 and the floor 410. In the alternative, nub sides 502 can be curved or sloped outwards and downwards to meet the floor 410, so that the base of the nub 470 is wider than the top of the nub 470, when viewed from the side. The nub 470 can extend upwards from the floor 410 into the cavity 440. The nub 470 is sized and shaped to correspond with a notch in the listing bead. The nub 470 can have a nub width NW of approximately 3 millimeters, and can have a nub height NH of approximately 2-3 millimeters. In various embodiments, one or more nubs 470 can be located on the floor 410 and/or on one or more legs 420, and can extend into the cavity 440. The location of the at least one nub 470 corresponds to the location of at least one notch on the listing (not shown). In the embodiment of FIGS. 5A and 5B, the nub 470 is on the floor 410, and the notch is in the bottom edge of the listing.

The legs 420 can have outer leg sides 510. Outer leg sides 510 can be approximately vertical, i.e. approximately 90 degrees. The clip 400 can have an outer curve 512 between the base area 508 and the outer leg side 510. Outer curve 512 can have a radius R3 of 3.0 millimeters+/−0.5 millimeter. The legs 420 can have inner leg sides 514. Inner leg sides 514 can be approximately vertical at the calf 424, forming an approximately vertical calf inner side 516. Inner leg side 514 can be angled downwards and inwards at the thigh 422, forming a thigh inner side 518. The thigh inner side 518 can be an angle of between approximately 80 and 85 degrees from horizontal between the calf inner side 516 and the curved floor side 414. In the alternative, the inner thigh side can be curved and/or angled downwards and inwards in a way that is variable between the calf 424 and the curved floor side 414. The thigh inner side 518 can be curved inwards more sharply (with a smaller radius) at the lower thigh 426, and can have a decreasing inward angle or curve at the upper thigh 428 until it is nearly vertical where the thigh inner side 518 meets the calf inner side 516.

The cavity 440 can be partially defined by the approximately vertical calf inner side 516, an angled thigh inner side 518, the curved floor side 414, and the central region 412 of the floor 410. The surfaces that partially define the cavity 440 can be free of corners from one upper thigh 428 to the floor 410 to the other upper thigh 428. The absence of corners makes the clip 400 stronger and helps to prevent a leg 420 from breaking when the leg 420 is flexed outward when the listing is pushed through the gap 450. The calf 424 can be of uniform thickness, and with an approximately vertical outer leg side 510 and an approximately vertical calf inner side 516. In the alternative, the cavity 440 can be partially defined by the approximately vertical calf inner side 516, and the thigh inner side 518 that can angle or curve inwards slightly at the upper thigh 428, and can angle or curve inwards increasingly at the lower thigh 426 until the thigh inner side 518 meets the curved floor side 414 of the floor 410. The surfaces that partially define the cavity 440 can be continuously curved from one upper thigh 428 to the floor 410. The surfaces that partially define the cavity 440 can be continuously curved from one upper thigh 428 to the floor 410 to the other upper thigh 428.

The thigh 422 can taper from a thinner region at the upper thigh 428 to an increasingly thicker region at the lower thigh 426, and can have an inner thigh side 518 that increasingly angles or curves inwards from the upper thigh 428 to the lower thigh 426. The thigh 422 can be at least partially defined by the outer leg side 510. The clip 400 can have a floor radius R2 between the floor 410 and the leg 420 that can be approximately 0.76 millimeter+/−0.15 millimeter. The absence of corners where the floor 410 meets the legs 420 adds strength to the clip 400 and can help prevent the legs 420 from breaking when outward pressure is applied to a leg 420 from the listing.

The bottom face 436 can have a barb angle BA between approximately 20 to 35 degrees from horizontal. Inner radius R1 between the bottom face 436 and the leg 420 can be approximately 0.38 millimeter+/−0.15 millimeter. The absence of corners where the legs 420 meet the barbs 430 strengthens the clip 400 and helps to prevent the barb 430 from breaking when pressure is applied to the barb 430 from the listing.

The clip 400 can have an outer clip width CW of approximately 7.8 millimeters+/−0.5 millimeter. Outer clip width CW can be the width of the clip 400 without (free-of) the extensions 460. Outer clip width CW can be measured from one outer leg side 510 to the other outer leg side 510. The clip 400 can have an extension width EW of approximately 13 millimeters+/−0.5 millimeter. The clip 400 can have a clip height CH of approximately 10.5 millimeters+/−0.5 millimeter. The clip height CH can be measured from the top of the clip 400 to the base area 508. Note that in alternate embodiments, the height CH of the clip can vary based on the application, the location within the seat and the style/type of upholstery—for example, low-profile clips can be used in a thin, firm seat, while taller clips can be used in a thicker, more-cushioned seat.

Figure 6A:
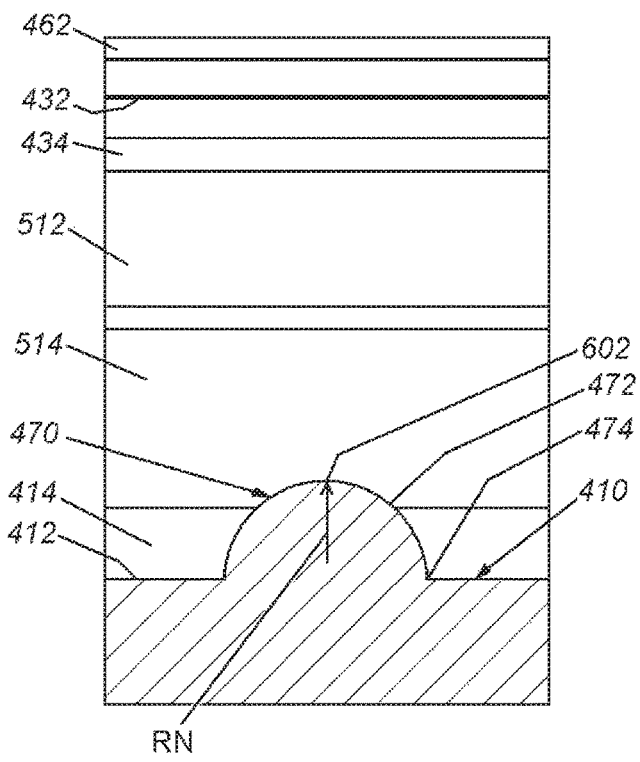
FIG. 6A is a cross-section view of the exemplary stop clip with an inner nub along line 6-6 of FIGS. 5A and 5B, according to an embodiment.

FIG. 6A is a cross-section view of the exemplary stop clip with an inner nub along line 6-6 of FIGS. 5A and 5B. The clip 400 can have an extension face 462, a slide 432, a barb face 434, a calf inner side 516, a thigh inner side 518, a curved floor side 414, and a nub 470 with an engagement surface 472. The engagement surface 472 meets the floor 410 at the engagement surface unions 474. The engagement surface 472 can start at one engagement surface union 474 where the nub 470 meets the floor 410 at one side of the nub 470, and the engagement surface 472 can end where the nub 470 rises from the floor 410 at the other engagement surface union 474 where the nub 470 meets the floor 410 at the other side of the nub 470. At least a portion of engagement surface 472 can be a curved surface. Engagement surface 472 can be continuously curved from one side to the other. Engagement surface 472 can be a portion of a circle, or an arc, when viewed from the side. Engagement surface 742 can be a semicircle when viewed from the side. Nub 470 can be a portion of a disc. Nub 470 can be half of a disc. When viewed in cross section, the nub 470 can appear to be a portion of a disc extending up from the floor 410. The nub 470 can have a radius RN that can be approximately 0.5-3.0 millimeters. The nub 470 can have a top portion 602 that is at the top of the nub, at the part of the nub that is farthest away from the floor 410.

Figure 6B:
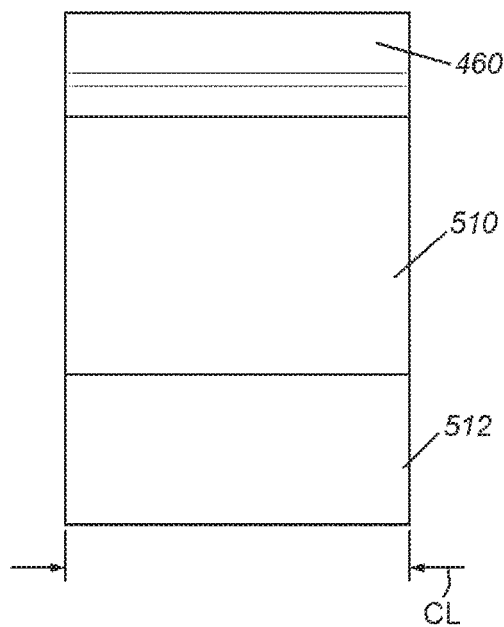
FIG. 6B is a front view of an exemplary stop clip, according to an embodiment.

FIG. 6B is a front view of an exemplary stop clip, according to an embodiment. Clip 400 can have an extension 460, an outer leg side 510, and an outer curve 512. Clip 400 can have a clip length CL of approximately 7 millimeters+/−0.15 millimeter. However, in alternate embodiments, the clip length CL can be highly variable and can be substantially longer or somewhat shorter—e.g. 5 to 15 millimeters depending upon the application, contour of the seat desired clip strength, and other appropriate factors/parameters.

Figure 7:
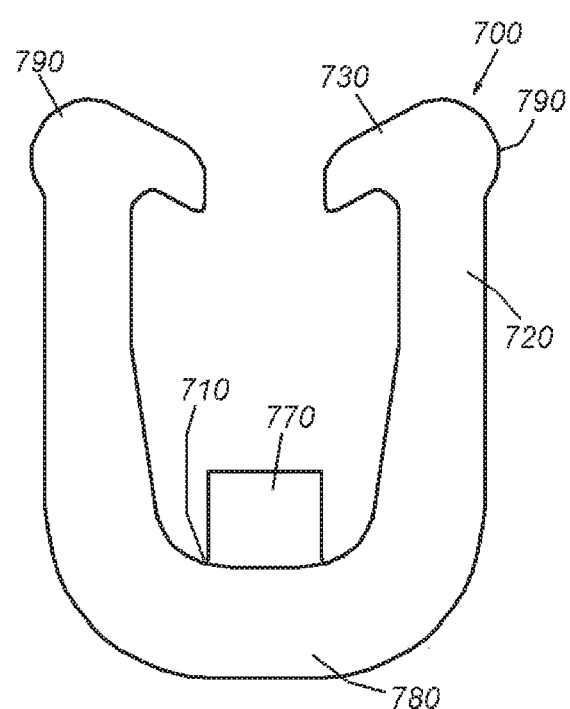
FIG. 7 is a front view of another exemplary stop clip, according to an embodiment.

FIG. 7 is a front view of another exemplary stop clip, according to an embodiment. Stop clip 700 can have an inner stop nub 770, a floor 710, a base 780, legs 720, and barbs 730. Stop clip 700 can have a similar shape and dimensions to stop clip 400, except that stop clip 700 can be free of upper extensions, such as extensions 460 shown in FIG. 4, and stop clip 700 can have upper shoulders 790. Upper shoulders 790 can be a portion of the clip at the junction of a leg 720 and a barb 730. Upper shoulders 790 can be thicker than barbs 730 or legs 720, and the thicker portion of the clip 700 at the upper shoulder 790 can increase the strength of the clip 700 between the barbs 730 and the legs 720. Upper shoulders 790 can extend upwards and outwards from the upper corners of the clip 700. Upper shoulders 790 can define a portion of a circle.

II. Notched Listing Beads for Use with Stop Clips

Figure 8:
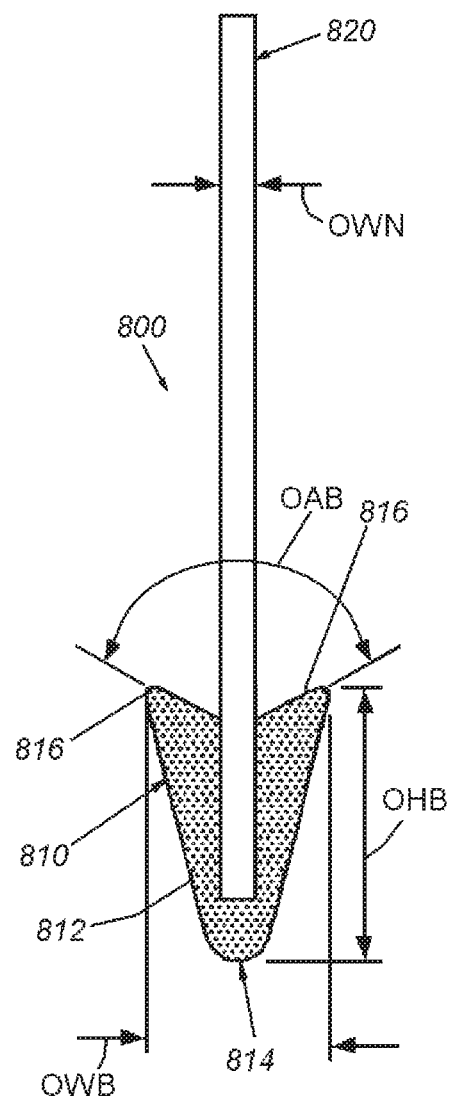
FIG. 8 is a side view of an exemplary listing showing relative dimensions of the various components of the bead assembly and web, according to an embodiment.

A listing bead can be sized and shaped for use with various stop clips. A listing bead designed for use with a stop clip can have a notch that is sized and shaped to accommodate a stop nub, explained more fully below. FIG. 8 is a side view of an exemplary listing showing relative dimensions of the various components of the bead assembly and web, according to an embodiment, however, it should be clear that the listing bead and stop clip are designed to fit with each other, and various dimensions are possible. The listing bead can be extruded and formed around the web or non-woven fabric. A version of this method is described in commonly owned U.S. patent application Ser. No. 14/839,386, entitled LISTING BEAD FOR UPHOLSTERY CLIPS, by Agonia et al., the teachings of which are expressly incorporated herein by reference. The listing 800 comprises a bead assembly 810 and an engaged/adhered fabric web 820. The bead assembly 810 defines a bead 812 with a cross-sectional shape extending downwardly to a rounded point 814 in the shape of an arrow from upper bead barbs 816 at the upper ends that are arranged to engage the conforming barbs 430 of the clip 400.

The bead tip 814 bridges and joins opposing halves of the bead assembly 810 each defining and opposing, mirror image of the cross sectional profile of bead 412 and bead barb 816. The two halves sandwich the web 820, which is constructed from any acceptable material in any acceptable manner—for example a woven or non-woven polypropylene, or other synthetic or natural fabric. The web material is somewhat flexible and can be readily stitched, fastened, adhered and/or fused (by heating, melting, ultrasonic welding, etc.) into engagement with the seat trim cover. In an embodiment, the web 820 is introduced between the halves of the bead assembly 810 as it exits an extrusion die (described further below referring to FIG. 14) and the halves of the semi-hardened bead (existing the die) are folded about the bead tip 814 so that the each contact, and fuse to an opposing side of the web. The bead can be constructed of an automotive grade plastic/polymer (and blends of plastic/polymer). In alternate embodiments, the halves can be joined to the web by adhesives, welding, melt-fusion, etc.

While the dimensions of the bead 810 and web 820 are highly variable, the following exemplary dimensions can be employed in an embodiment. Referring to FIG. 8, the overall width OWB of the bead 812 can be approximately 3.5 to 5.0 (e.g. 4.8 millimeters+/−0.5) millimeters with an exemplary tip (814) radius of approximately 0.8 millimeters. The overall bead height OHB can be approximately 4 to 7 millimeters (e.g. approximately 5.7 millimeters+/−0.5). The overall width/thickness OWW of the web 820 can be approximately 0.5 to 1.5 millimeters (e.g. 0.7 millimeters). In this embodiment, the barbs 816 define top surfaces that are set off from each other at an overall angle OAB of approximately 122 degrees, symmetrical about the vertical (i.e. the direction of extension of the web 420). It is expressly contemplated that the barb angle OAB can vary widely, in part to match that of the confronting clip bottom surfaces 436, as described above.

Figure 9:
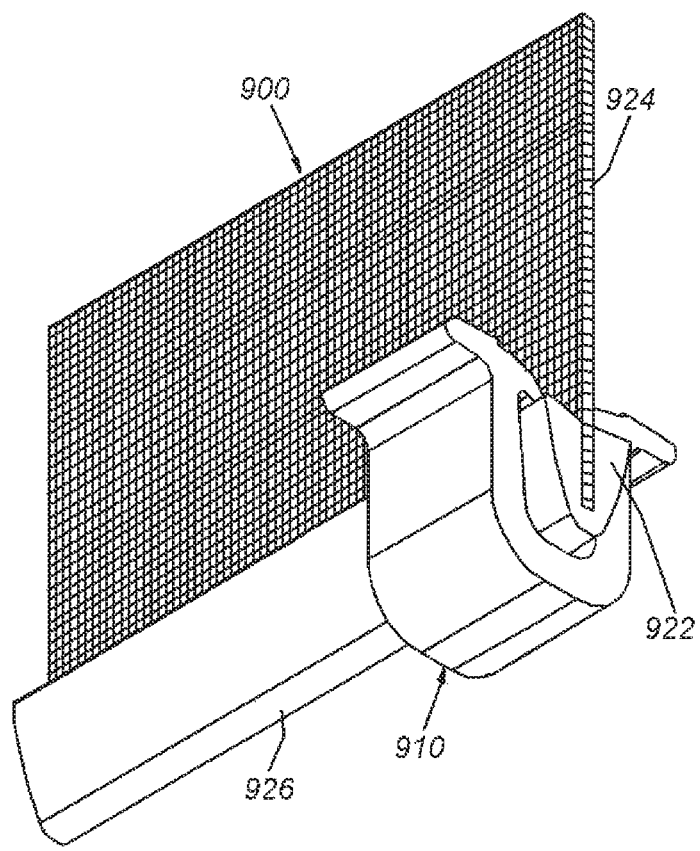
FIG. 9 is a perspective view of an exemplary seat cover securing system having a stop clip engaged with a listing bead on a web, according to an embodiment.

FIG. 9 is a perspective view of an exemplary seat cover securing system having a stop clip engaged with a listing bead on a web, according to an illustrative embodiment. The exemplary seat cover securing system 900 includes a stop clip 910 and a listing 920. The listing includes a bead assembly 922 and an engaged/adhered fabric web 924. The bead assembly 922 includes a bead tip 926. The bead top 926 has a notch that is sized and shaped to correspond to the nub within the clip, so that the nub engages with the notch and prevents the bead assembly 922 from sliding back and forth within the stop clip 910. A stop clip 910 can be engaged with the listing bead assembly 922, and the web 924 can be affixed to a seat cover (not shown). The listing bead assembly 922 with the attached stop clip 910 can then be engaged with an embedded clip within a foam seat, thereby attaching the seat cover to the foam seat. The stop clip can be located next to the embedded clip, so that the listing bead assembly 922 cannot slide within the embedded clip.

Figure 10:
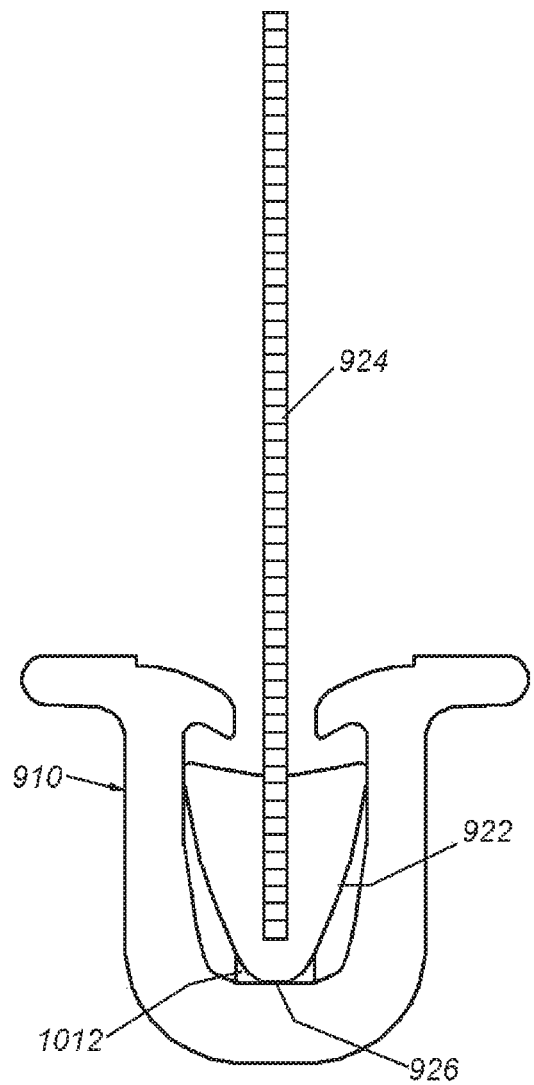
FIG. 10 is a side view of an exemplary seat cover securing system having a stop clip with an inner nub that is engaged with a listing bead having a corresponding notch, according to an embodiment.

FIG. 10 is a side view of an exemplary stop clip with an inner nub engaged with a listing bead having a corresponding notch, according to the illustrative embodiment. Stop clip 910 can have a nub 1012 on an inner surface of clip 910. Bead tip 926 can have a notch in the bead tip 926 that is sized and shaped to engage with the nub 1012. The nub 1012 is engaged into the notch. When the nub 1012 is engaged into the notch, the bead assembly 922 is prevented from sliding within the stop clip 910 in the direction of in and/or out of the page.

Figure 11A:
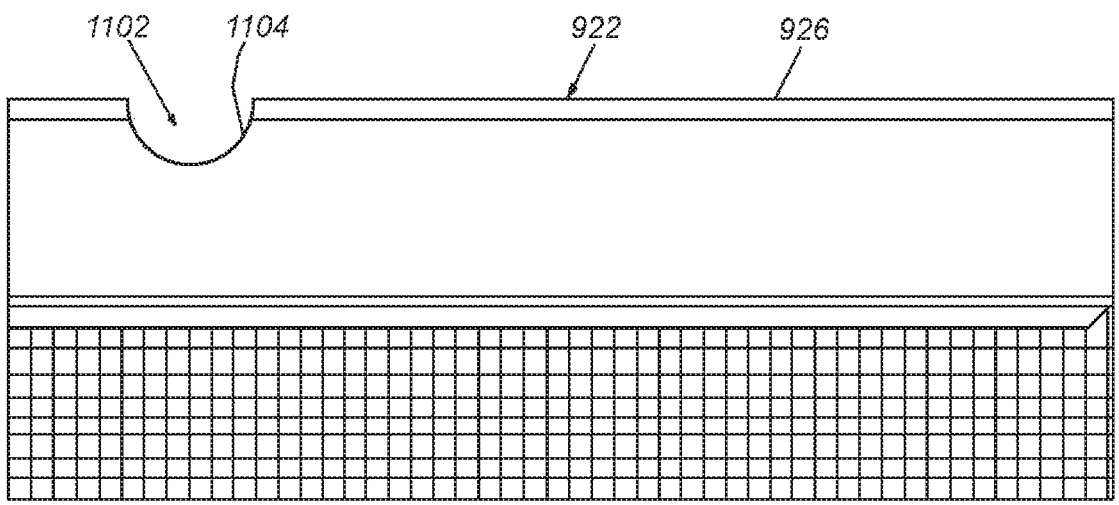
FIG. 11A is a front view of an exemplary listing assembly with a notch in the listing bead, according to an embodiment.

FIG. 11A is a partial front view of an exemplary listing assembly with a notch in the listing bead, according to an embodiment. The bead tip 926 has a notch 1102 that is sized and shaped to be engaged with a corresponding nub on a stop clip. The notch 1102 can be curved. Notch 1102 can be the shape of a portion of a circle when viewed from the side. Notch 1102 can be the shape of a semicircle when viewed from the side. Notch 1102 is defined by a notch surface 1104 on the bead assembly 922. Notch surface 1304 can be a curved surface that is the shape of portion a circumference of a circle when viewed from the side. The curve of the notch surface 1104 prevents the notch 1102 from significantly weakening the bead assembly. In various embodiments, the size and shape of the notch can be designed to correspond to the size and shape of the nub. A notch that is cut with straight lines, corners, and/or sharp angles can result in a bead assembly with less structural integrity that is more likely to crack or break under pressure. By utilizing a curved notch surface, the notch can be removed from the bead without (free-of) causing significant weakening. The curved notch avoids breaking, fracture, or cracking of the listing. This curved notch shape also avoids breaking, fracture, or cracking of the listing as there are no substantial stress concentrations. This characteristic is advantageous, particularly where the upholstery is exposed to extreme cold and/or significant temperature extremes. However, it should be noted that other shapes for the notch are specifically contemplated, including triangular, square, rectangular, or other shapes with 90 degree angles in the notch, or other shapes with various other angles that may be greater than or less than 90 degrees. The notch can be cut out from the bead assembly using cutting equipment known in the art.

Figure 11B:
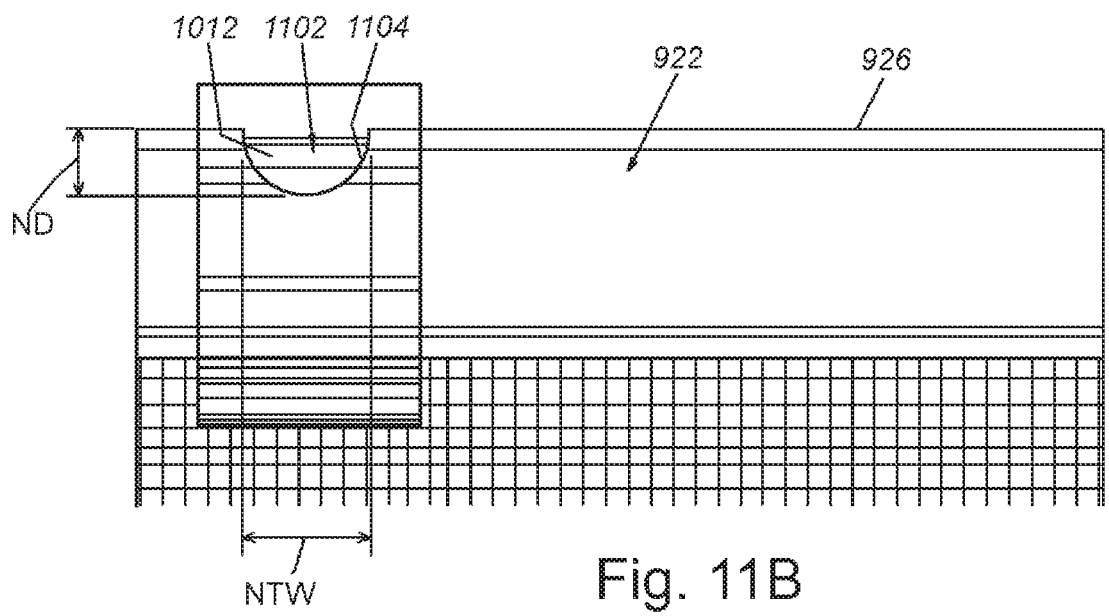
FIG. 11B is a partially transparent front view of an exemplary stop clip with an inner nub engaged with a corresponding notch in a listing bead, according to an embodiment.

FIG. 11B is a partially transparent front view of an exemplary stop clip with an inner nub engaged with a corresponding notch in a listing bead, according to an embodiment. The bead tip 926 has a notch 1102 that is sized and shaped to accommodate the nub 1012 that is shown as partially transparent and engaged with the notch 1102. In an embodiment, the notch 1102 can have a notch width NTW of approximately 3 millimeters, and a notch depth ND of approximately 2-3 millimeters. The nub is sized and shaped to engage with the notch 1102. While the size and shape of the notch 1102 can be affected by many factors including structural integrity of the bead assembly and the cutting speed of the cutting tool used to cut the notch, the size and shape of the nub can be designed to correspond to the size and shape of the notch.

With the nub engaged into the notch, the bead assembly is prevented from sliding back and forth within the locking stop clip. The barbs 430 can engage with the bead barbs 816 to prevent the bead from pulling out of the clip, and can thereby maintain the notch in engagement with the nub. The engagement of the nub within the notch prevents the stop clip from moving along the bead assembly.

A user can use a listing bead with a stop clip to apply an upholstery cover onto a foam seat body. The user can engage a listing bead within a cavity of a stop clip by pressing the bead tip of a listing bead assembly into the gap between the legs of a stop clip. As the listing bead assembly passes through the gap, the legs can flex outwards to allow the listing bead assembly to pass into the cavity. The user can prevent the listing bead from sliding within the clip by engaging the nub of the clip within the notch of the listing bead. After the listing bead has passed below the barbs, the legs can return to the relaxed shape with a gap that is narrower than the listing bead. The barbs can hold the listing bead within the cavity and prevent the listing bead from pulling out of the cavity. The locking nub can engage with the notch and can prevent the stop clip from moving along the length of the listing bead.

III. Upholstery Secured Using Stop Clips

Figure 12A:
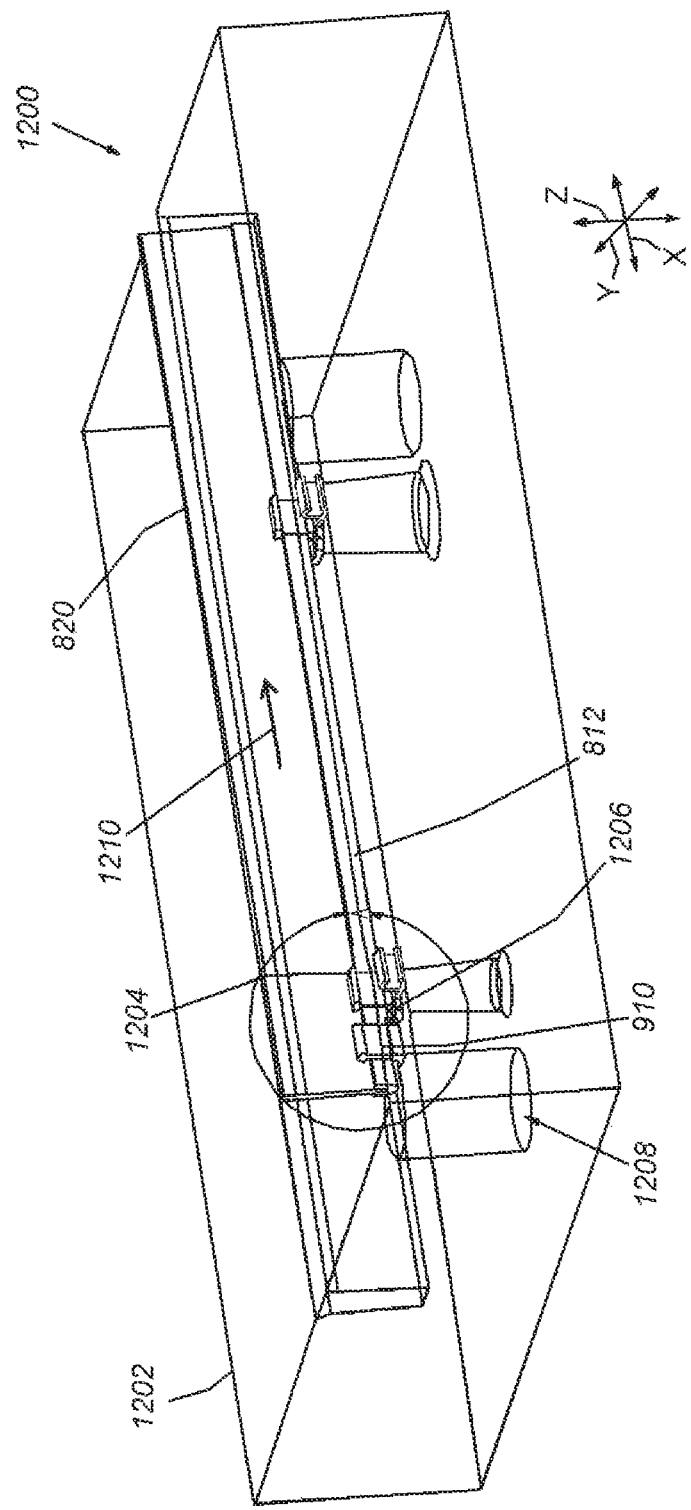
FIG. 12A is a perspective view of a stop clip securing an upholstery cover in a seat, according to an embodiment.

FIG. 12A is a perspective view of a stop clip securing an upholstery cover in a partial seat, according to an embodiment. A partial seat 1200 can have a foam seat body 1202, shown in phantom in FIG. 12. The foam seat body can have at least one embedded clip 1204. Embedded clip 1204 can have a base 1206 that can be securely embedded within the foam seat body 1202, and base 1206 can resist pullout and keep the embedded clip 1204 securely embedded within the foam seat body. A stop clip 910 can be secured to the listing bead 812 with the nub of the stop clip engaged with the notch of the listing bead so that the stop clip cannot move along (i.e. in a longitudinal direction) the listing bead, and the web 820 can be secured to a seat cover (not shown). A user can attach the stop clip 910 to the listing bead 812, and can attach the web 820 to the seat cover. Attachment is accomplished in a conventional manner using manual or automated techniques to drive the stop clip onto the bead (with the clip and bead elastically deforming variously under the driving pressure) until the listing captures the barbs of the clip, and thus, resists pullout thereof. The upholstery cover can be secured to the foam seat by engaging the listing bead 812 within the cavity of the embedded clip 1204 embedded within the foam seat body 1202. A grasping tool can be extended through hole 1208, and can grasp the listing bead 812 and pull the listing bead 812 downwards into engagement with the embedded clip 1204, thereby securing the seat cover to the foam seat body 1202. The stop clip 910 can be positioned on the listing bead 812 next to the embedded clip 1204 in the foam seat 1202, thereby preventing the listing bead 812 from sliding within the embedded foam clip in the direction of arrow 1210. A single stop clip can prevent the listing bead from sliding in one longitudinal direction relative to the embedded foam clip, while two appropriately placed stop clips can be used to prevent the listing bead from sliding in either, opposing, direction relative to the embedded clip. The two stop clips in such an arrangement can be located, respectively, on opposing sides of an embedded clip so that the embedded clip is fully captured in the longitudinal direction. Alternatively, each of the two (or more) stop clips can be placed with respect to (and abut) different/discrete embedded clips along the listing—for example one stop clip is located outside (forward of) the front most embedded clip and the other stop clip is located outside (rearward of) the rear most embedded clip. Likewise, a pair of embedded clips can surround and abut a stop clip to achieve bi-directional (longitudinally) restraint of the listing/upholstery cover versus the foam cushion. The embedded clips, themselves can be any acceptable arrangement as described above and further below.

Figure 12B:
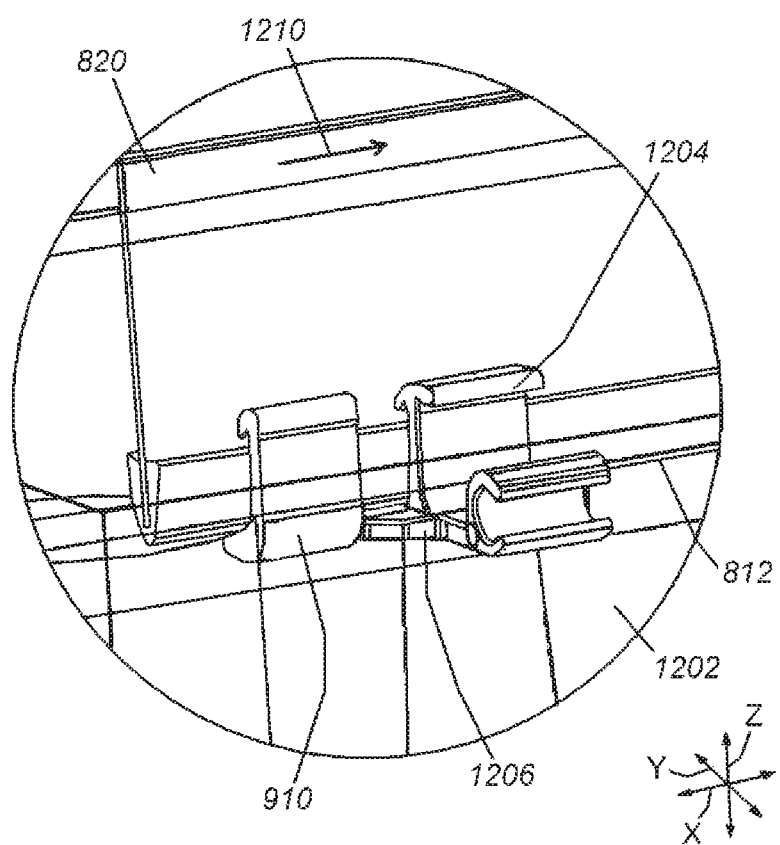
FIG. 12B is a detailed view of the stop clip securing an upholstery cover in a seat, as shown in FIG. 12A.

FIG. 12B is a detailed view of the stop clip securing an upholstery cover in a seat, as shown in FIG. 12A. The stop clip 910 is engaged with the listing bead 812 with the nub of the stop clip engaged with the notch of the listing bead, so that the stop clip is prevented from moving in the (i.e. longitudinal) direction of the X-axis relative to/along the listing bead. The legs of the embedded clip 1204 can prevent the listing bead 812 from moving in the direction of the Y-axis relative to the embedded clip 1204, and the floor of the embedded clip 1204 and the barbs of the embedded clip 1204 can prevent the listing bead from moving in the direction of the Z-axis relative to the embedded clip 1204. The stop clip 910 can be next to the embedded clip 1204 on the listing bead 812. Because the stop clip 910 is secured to the listing bead 812, the stop clip 910 can rest against the embedded clip 1204 and prevent the listing bead from moving along the X-axis in the direction of arrow 1210. Any force exerted on the seat cover in the (longitudinal) direction of arrow 1210 can be met with resistance as the stop clip 910 is pressed against the embedded clip 1204, thereby preventing the seat cover from moving in the direction of arrow 1210. In various embodiments, a listing bead 812 can have a second notch on the other side of the embedded clip, and a second stop clip can be attached to the listing bead 812 on the other side of the embedded clip, thereby securing the listing bead relative to the embedded clip in both directions of the X-axis.

Figure 12C:
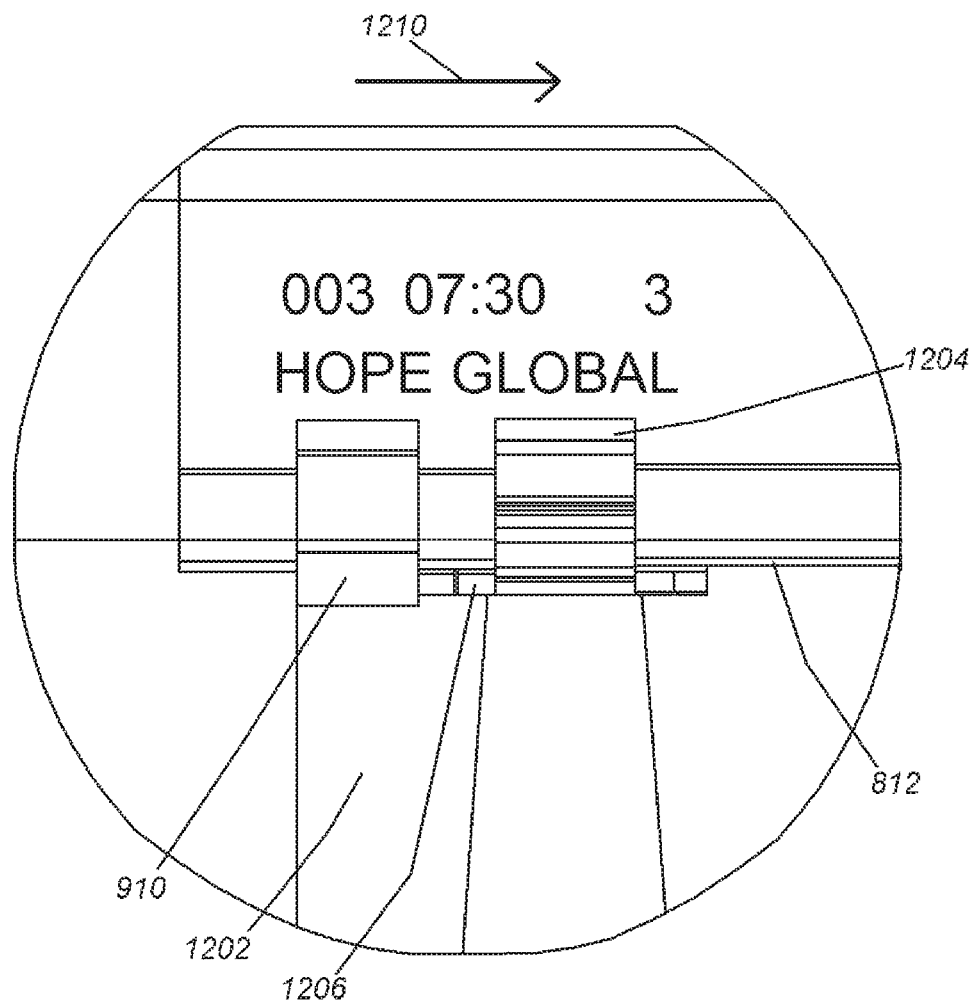
FIG. 12C is a detailed front view of the stop clip securing an upholstery cover in a seat, as shown in FIG. 12C.

FIG. 12C is a detailed front view of the stop clip securing an upholstery cover in a seat, as shown in FIG. 12B. The embedded clip 1204 can have a base 1206 that can be embedded within the foam seat body 1202. The stop clip 910 can be adjacent to the embedded clip 1204. In an embodiment, the stop clip 910 can abut the base 1206 so that the stop clip 910 and attached listing bead 812 cannot move in the direction of arrow 1210 relative to the embedded clip 1204. In various embodiments the embedded clip may have various bases and/or structures, and the stop clip 910 may abut various portions or structures of the embedded clip, such as the legs of the embedded clip, so that the stop clip and listing bead are prevented from moving in the direction of arrow 1210.

Figure 12D:
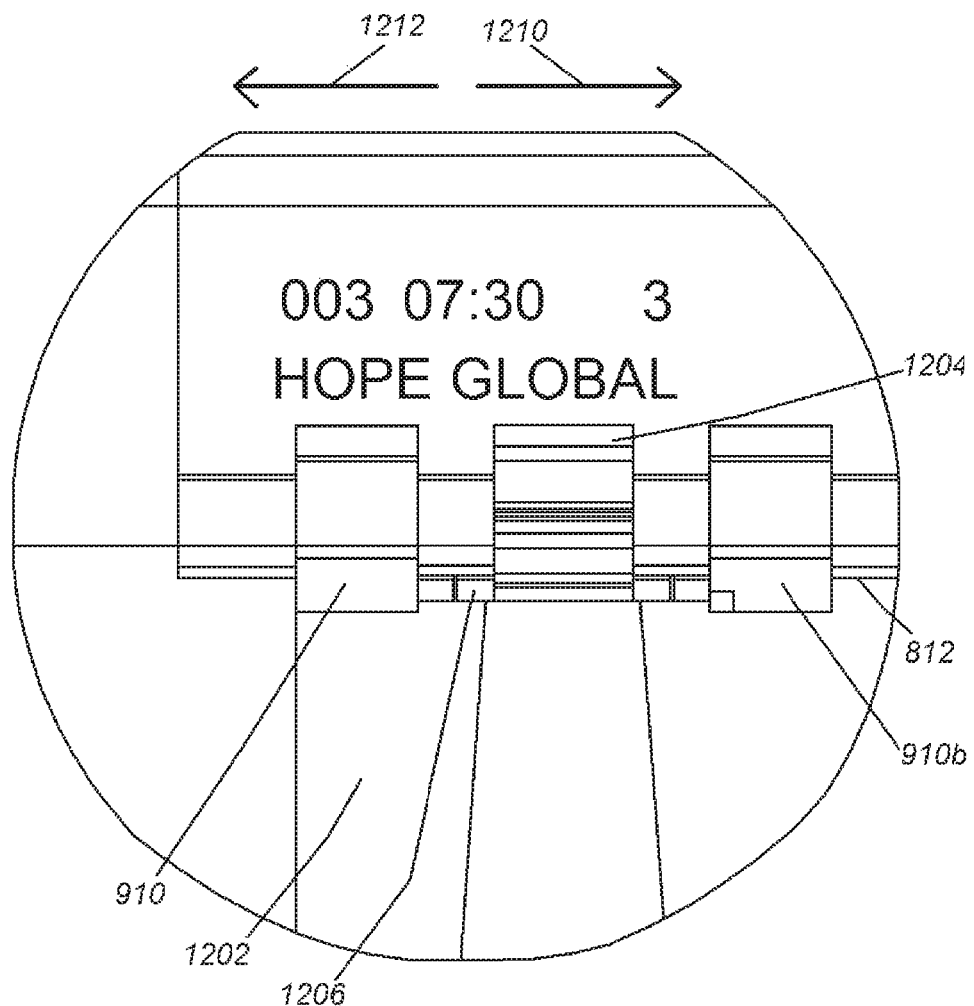
FIG. 12D is a detailed front view of two stop clips on opposing sides of an embedded clip securing an upholstery cover in a seat, according to an embodiment.

FIG. 12D is a detailed front view of two stop clips on opposing sides of an embedded clip securing an upholstery cover in a seat, according to an embodiment. Two stop clips can be located, respectively, on opposing sides of an embedded clip so that the embedded clip is fully captured in the longitudinal direction. The foam seat body can have at least one embedded clip 1204 that can have a base 1206 that can be securely embedded within the foam seat body. Two stop clips 910 and 910b can be secured to the listing bead such that they are on opposing sides of the embedded clip, as shown in FIG. 12D. The stop clips 910 and 910b are engaged with the listing bead 812 with the nubs of the stop clips engaged with the notches of the listing bead, so that the stop clips are each prevented from moving in the (i.e. longitudinal) direction of arrows 1210 and 1212 along the X-axis relative to/along the listing bead. Stop clip 910 can rest against one side of the embedded clip 1204 and prevent the listing bead from moving in the (longitudinal) direction of arrow 1210, and stop clip 910b can rest against the opposing side of the embedded clip 1204 and prevent the listing bead from moving in the opposing (longitudinal) direction of arrow 1212, thereby securing the listing and attached seat cover in both longitudinal directions along the X-axis. Having two stop clips on opposing sides of an embedded clip can help in aligning a seat cover so that no wrinkles are present when the seat trim cover is assembled with the foam seat body.

Figure 12E:
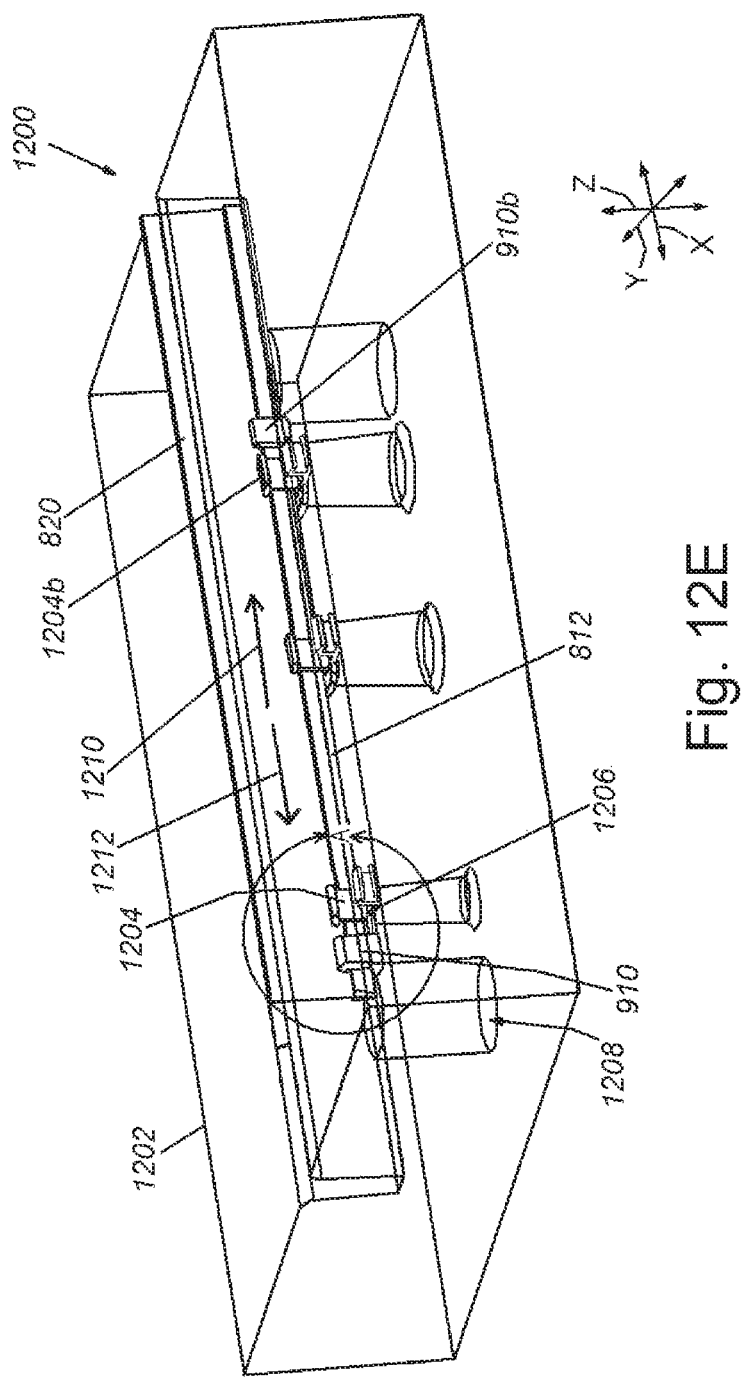
FIG. 12E is a perspective view of two stop clips and two embedded clips securing an upholstery cover in a seat, according to an embodiment.

FIG. 12E is a perspective view of two stop clips and two embedded clips securing an upholstery cover in a seat, according to an embodiment. Each of the two (or more) stop clips can be placed with respect to (and abut) different/discrete embedded clips along the listing. The foam seat body can have at least two embedded clips 1204 and 1204b that can be securely embedded within the foam seat body 1202. As shown in FIG. 12E, one stop clip 910 can be attached to the listing bead 812 and located outside (forward of) the front most embedded clip 1204, and the other stop clip 910b can be secured to the listing bead and located outside (rearward of) the rear most embedded clip 1204b, as shown in FIG. 12E. The stop clips 910 and 910b are engaged with the listing bead 812 with the nubs of the stop clips engaged with the notches of the listing bead, so that the stop clips are each prevented from moving in the (i.e. longitudinal) direction of arrows 1210 and 1212 along the X-axis relative to/along the listing bead. Stop clip 910 can rest against the forward side of the forward embedded clip 1204 and prevent the listing bead 812 from moving in the (longitudinal) direction of arrow 1210, and stop clip 910b can rest against the opposing, rearward side of the rearward embedded clip 1204b and prevent the listing bead from moving in the opposing (longitudinal) direction of arrow 1212, thereby securing the listing and attached seat cover in both longitudinal directions along the X-axis. Having two stop clips on opposing sides of two embedded clips can help in aligning a seat cover so that no wrinkles are present when the seat trim cover is assembled with the foam seat body.

Figure 12F:
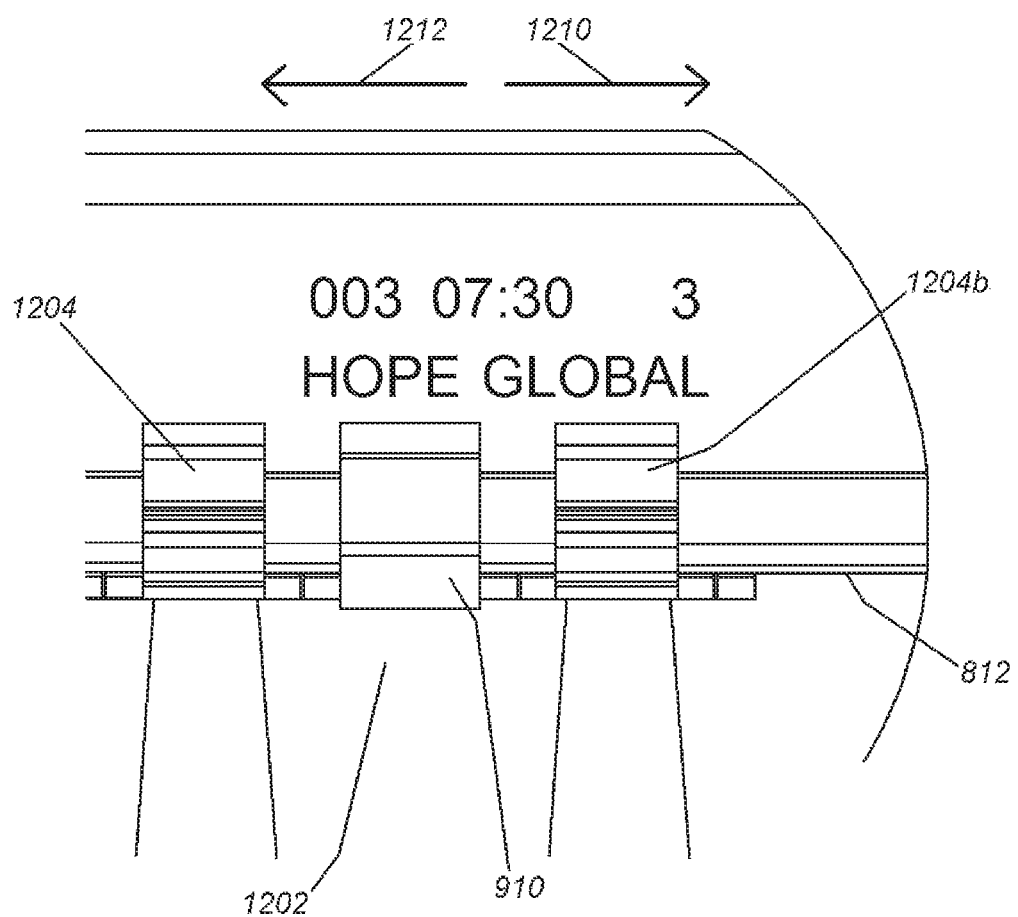
FIG. 12F is a detailed front view of two embedded clips on opposing sides of a stop clip securing an upholstery cover in a seat, according to an embodiment.

FIG. 12F is a detailed front view of two embedded clips on opposing sides of a stop clip securing an upholstery cover in a seat, according to an embodiment. A pair of embedded clips 1204 and 1204b can surround and abut a stop clip 910 to achieve bi-directional (longitudinal) restraint of the listing/upholstery cover relative to the foam cushion. The stop clip 910 can be located on the listing bead 812 such that it can be positioned between and abutting the two embedded clips 1204 and 1204b that are embedded in the foam 1202 of the foam seat body. The stop clip 910 is engaged with the listing bead 812, with the nub of the stop clip engaged with the notch of the listing bead, so that the stop clip 910 is prevented from moving in the (i.e. longitudinal) direction of arrows 1210 and 1212 along the X-axis relative to/along the listing bead. Stop clip 910 can rest against the rearward side of the forward embedded clip 1204 and can prevent the listing bead 812 from moving in the (longitudinal) direction of arrow 1212. Stop clip 910 can also rest against the forward side of the rearward embedded clip 1204b and can prevent the listing bead 812 from moving in the longitudinal direction of arrow 1210. By resting against both embedded clips 1204 and 1204b, the stop clip 910 can secure the listing and attached seat cover in both longitudinal directions along the X-axis. Having stop clip positioned between two embedded clips can help in aligning a seat cover so that no wrinkles are present when the seat trim cover is assembled with the foam seat body.

IV. Extruded Stop Clips

Figure 13:
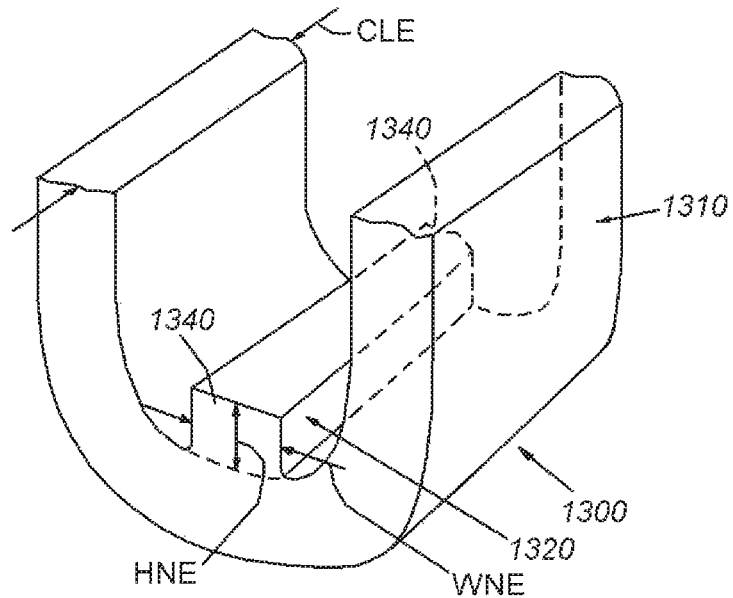
FIG. 13 is a fragmentary prospective view of an exemplary stop clip according to an alternate embodiment, in which the clip is formed by extrusion with a full-length nub profile.

While the above-described stop clip embodiments are manufactured, generally by injection molding or similar/equivalent techniques, it is contemplated that a version of the clip can be formed with a shape/cross section similar to that shown and described in FIGS. 4, 5A and 5B (etc.) above, but using an extrusion process that generates a continuous length of clip profile that is cut into desired lengths. These lengths can be the same, clip-to-clip, or can vary depending upon the application and/or location within the seat. Because an extrusion typically requires a continuous cross-section shape along the extrusion direction, the nub extends from end-to-end. Reference is thus made to the partial view of an extruded stop clip 1300 shown in FIG. 13. As shown, the cross section profile of the bottom end 1310 of the clip 1300 (which has upper legs and barbs similar or identical to that described above for FIGS. 4, 5A, 5B, etc.) includes a full-length "nub" 1320 that runs the full length CLE of the clip 1300. The height HNE of the nub is highly variable, and can be similar to the maximum height of the above-described rounded nub. The width WNE is also highly variable, and can be similar to the rounded nub width described above. While the nub ends 1340 are shown with square corners, various manufacturing techniques, such as grinding, clipping, machining, etc., can be employed to blunt or shorten the ends 1340.

Figure 14:
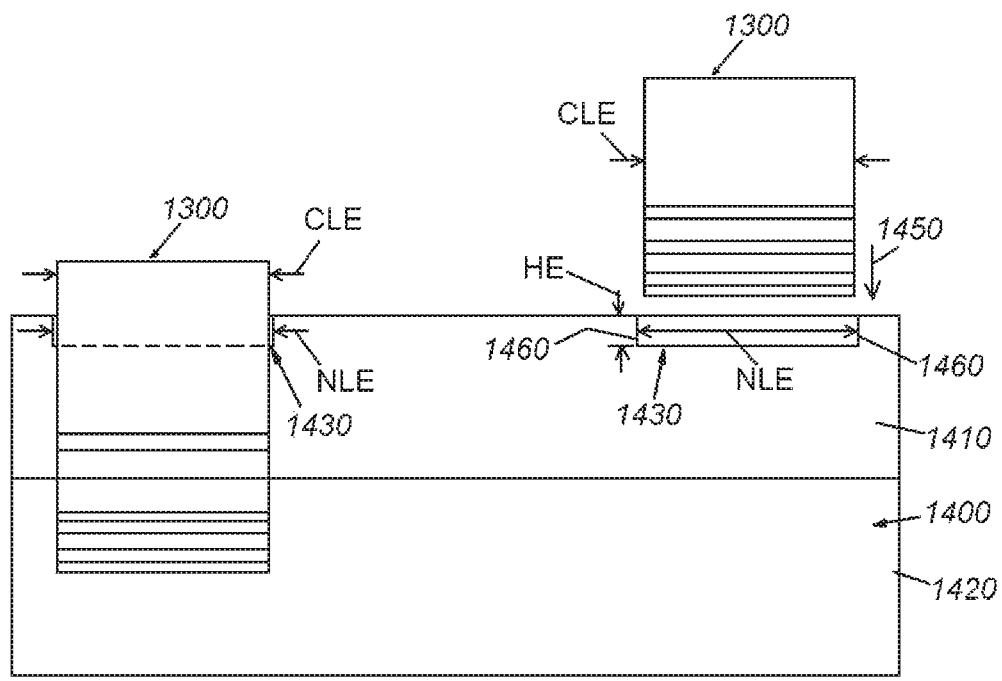
FIG. 14 is a front view of an exemplary listing showing relative dimensions of the various components of the bead assembly and web, according to an embodiment, including notches formed to receive the full-length nub of the clip of FIG. 13.

FIG. 14 is a front view of an exemplary listing showing relative dimensions of the various components of the bead assembly and web, according to an embodiment, including notches formed to receive the full-length nub of the clip of FIG. 14. As shown in FIG. 14, a listing 1400 with a bead 1410 and a web 1420 is adapted to receive the clip in a stopped manner. That is, the bead 1410 includes one or more rectangular (or another shape) notches 1430 that have a length NLE that is at least as long as the nub length (and clip length) CLE. The height/depth HE of the notch 1430 is at least as deep as the height HNE of the nub 1320. In this manner, the listing becomes fully engaged by the barbs of the clip during assembly (downward arrow 1450) with the nub 1320 captured by the notch 1430. Notably, this arrangement allows for the listing bead to be constructed in a crenelated manner, with a series of notches and each clip adapted to reside in a particular notch—in this manner, the upholstery is highly stable with respect to the cushion. While the notch ends 1460 are shown as right angles, they can be cut with rounded corners to relieve stress.

V. Embedded Stop Clips

In various embodiments, a clip configured to be embedded within a foam seat can have a stop nub, so that the listing bead cannot slide back and forth (it is longitudinally restrained) within the embeddable clip. Referring back to FIG. 5A, the clip 400 can have a base area 508 at the bottom of the clip 400. In various embodiments, the clip can have a base (not shown) at the bottom of the clip 400, and the stop clip can be embedded in the foam seat and also attached to the listing bead with the nub engaged within a notch (explained more fully below). The stop clip can have a hook, or catch, (not shown) at the bottom of the clip 400, and the clip can be attached to structures within the foam seat and also attached to the listing bead with the nub engaged within a notch (explained more fully below). Base area 508 can be on top of a base, or can be a part of the base. In an embodiment, base area 508 can be at the bottom of a base that is a flat member, so that the base area 508 is exposed on the bottom of the base. In an alternate embodiment, base area 508 is not exposed, but instead is joined to, or on top of a base. The base can be widely variable, and can include hooks, keys, flat members for engagement with foam, or other bases that will be known to those with skill in the art.

Figure 15:
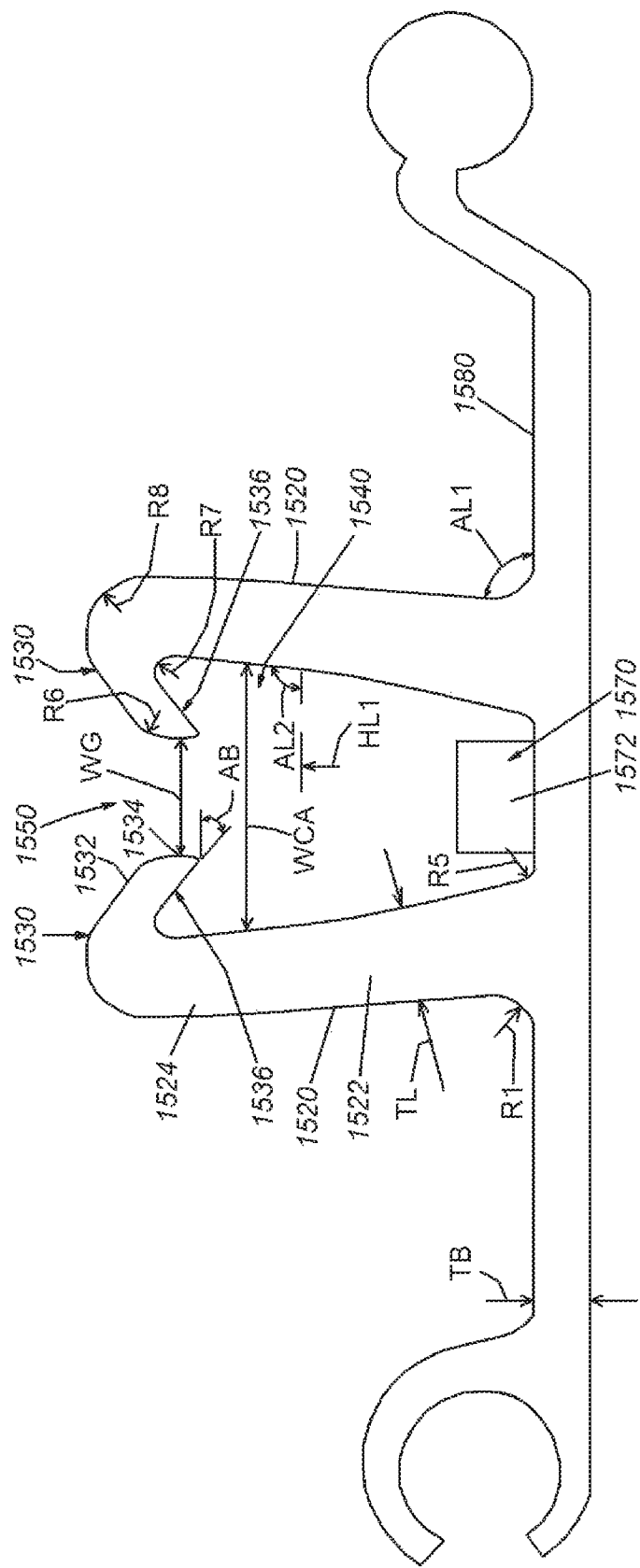
FIG. 15 is a side view of an exemplary stop clip with an embeddable base, according to an embodiment.

FIG. 15 is a side view of an exemplary stop clip with an embeddable base, according to an embodiment. The illustrative clip 1500 can be constructed with a generally linear and planar base 1580, however, in various embodiments, a clip can have hooks, catches, or other engaging structures for engaging with support structures within the foam. A pair of clip legs 1520 can extend upwardly from the base 1580 to a pair of barbs 1530. The clip 1500 can be free of extensions or outward projections at the top of the clip, such as extension 460. The barbs 1530 can have slides 1532 that can be angled at a slide angle SA of between approximately 25 and 35 degrees with an illustrative value of 32.84 degrees. The barbs 1530 taper toward, and terminate at, opposed, rounded-over ends at a gap 1550 that opens into a cavity 1540, adapted to receive and secure a listing bead having a geometry to be described further below. The gap 1550 can have a width WG of between approximately 1.2 and 3.0 millimeters. In an illustrative embodiment, the width WG of the gap 1550 is approximately 2.05+/−0.15 millimeters with the legs in a natural, unflexed state. The barb faces 1532 across the gap 1550 define surfaces that are approximately perpendicular with respect to the plane defined by the base 1580. In the region just below the gap 1550, the cavity 1540 between the legs 1520 opens to a widened width WCA of between approximately 4.5 and 5.5 millimeters. In an illustrative embodiment, the width WCA (with the legs in a natural, unflexed state) is approximately 4.71+/−0.15 millimeters. In an illustrative embodiment, the barbs 1530 that overlie and enclose this cavity extend inwards from the leg toward the gap 1550 a distance that is between approximately 1.2 to 1.5 millimeters. In an illustrative embodiment, each barb 830 extends inwardly from the leg a distance of approximately 1.44 millimeters.

Note that any angles taken with reference to the base are considered to be taken with reference to a horizontal plane generally passing through the base in a direction of extension of the base. In this embodiment the top base surface of the clip is essentially flat, so the horizontal reference plane is actually coplanar with the base top. Where the base has irregular surfaces in alternate embodiment, an arbitrary horizontal plane that passes through the roots of the clip legs, where they extend from the base can be used as the reference plane for clip member measurements as provided herein. Hence the base need not be, itself, planar in alternate embodiments.

A leg 1520 can have a thigh 1522 and a calf 1524. The legs 820 define an approximate leg thickness TL in a range of approximately 1.0 to 2.0 millimeters along their length with an illustrative value of approximately 1.53 millimeters. In an illustrative embodiment, the legs exhibit a substantially uniform thickness TL along all or substantially all their entire lengths (above the root radiuses or fillets (R4, R5)). This uniform thickness helps to better distribute bending loads and tension because the deflection along each leg is somewhat constant, thereby avoiding breakage during clip installation, bead installation and from pullout tension during field use. In the illustrative embodiment, the thighs 1522 extend from the base at a first angle AL1 that is in a range of between approximately 80 and 85 degrees with an illustrative value of 82.17 degrees. At an elevation HL1 of approximately 4.0 to 4.3 millimeters above the base 1580 (illustratively being 4.29 millimeters), the calves 1524 thereafter extend to their respective barbed tops at an angle AL2, which is closer to the perpendicular and measures approximately 88 to 90 degrees (90 in the illustrative embodiment). Each thigh 1522 defines either a constant thickness (TL) along its length to its respective root at the base. Alternative the thighs 1522 can define a slight outward taper toward the base for increased strength. Likewise, the roots of the legs define a slight fillet or radius with respect to the base to avoid stress concentrations inherent with sharp corners. In this embodiment, the outer base fillet R4 has a radius of approximately 1.48 millimeters, the radius R5 of the inner base fillet has a radius R2 of approximately 0.76 millimeter. The slide 1532 can be rounded over at the end to aid in guiding the listing bead into the gap 1550. The round over between the slide 1532 and the clip face 1534 can have a radius R6 of approximately 1.02 millimeter. The inside radius (within the cavity 1540) R7 between the inner leg 1520 and the barb 1530 can be approximately 0.38 millimeter. This affords a flattened bottom face 1536 at the bottom of each barb 1530 while avoiding stress concentrations in this region. The outer top radius for each barb R5 can be approximately 1.08 millimeter. The resulting overall height HC of the illustrative clip 1500 from the base bottom to barb tops can be approximately 10.0 millimeters or less.

While the illustrative clip legs generally exhibit thighs 1522 and calves 1524 that are each substantially linear and directed at differing angles, it is expressly contemplated that the legs can define a somewhat continuous curve, or that a larger number (than two) of linear segments can comprise each leg. As such the angles AL1 and AL2 are defined for the average or median angle of the curved or segmented sections of the leg that fall generally within the lower segment's elevation and upper segment's elevation, respectively.

Clip 1500 has a nub 1570 extending into the cavity 1540. The nub 1570 can engage with a corresponding notch in a listing (not shown). The nub 1570 can have an engaging surface 1572 on the top of the nub 1570. The engaging surface 1572 can nestle into the notch, thereby engaging the listing and preventing the listing from sliding within the clip 1500. The nub 1570 is pictured as being located on the floor 1510 of the clip 1500 and extending into the cavity 1540, however the nub could be located on a leg 1520 or a barb 1530 and extend into the cavity 1540. The nub 1570 can have nub sides 1574. Nub sides 1574 can be approximately vertical. In the alternative, nub sides 1574 can be curved or sloped outwards and downwards to meet the floor 1510, so that the base of the nub 1570 is wider than the top of the nub 1570, when viewed from the side. The nub 1570 can extend upwards from the floor 1510 into the cavity 1540. In various embodiments, one or more nubs 1570 can be located on the floor 1510 and/or on one or more legs 1520, and can extend into the cavity 1540. The location of the at least one nub 1570 corresponds to the location of at least one notch on the listing (not shown). In the embodiment corresponding to FIGS. 5A and 5B, the nub 1570 is on the floor 1510, and the notch is in the bottom edge of the listing.

Figure 16:
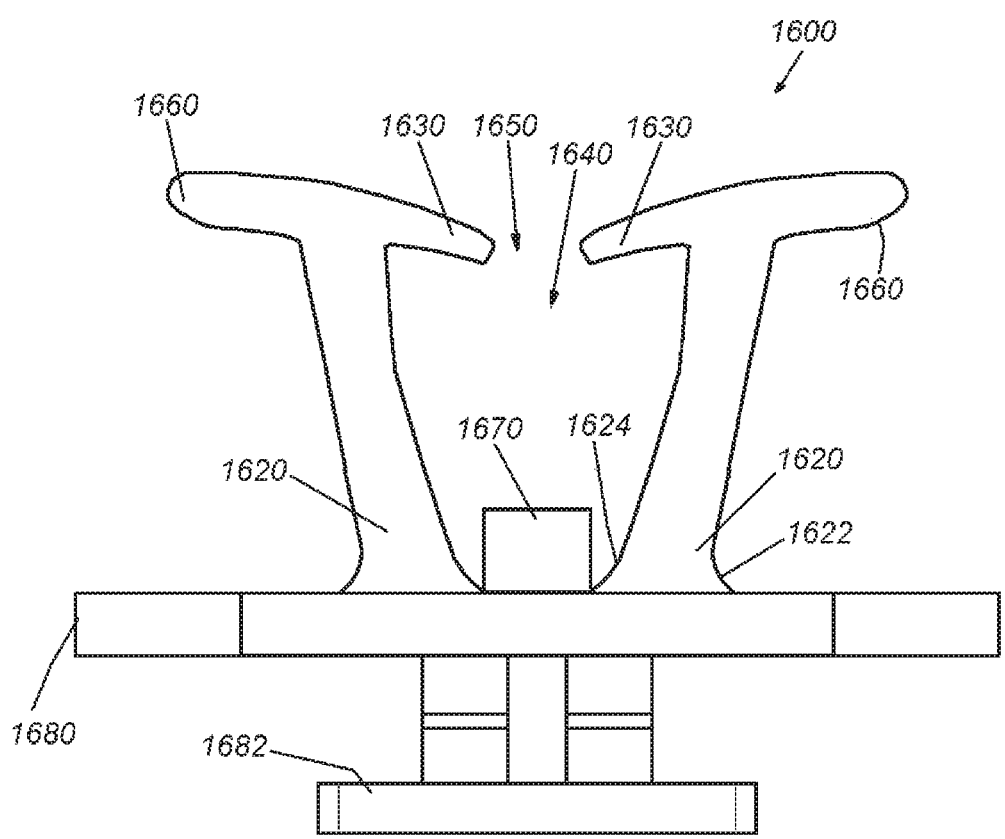
FIG. 16 is a side view of an exemplary stop clip with a key on the base, according to an embodiment.

FIG. 16 is a side view of an exemplary stop clip with a key on the base, according to an embodiment. Clip 1600 can have legs 1620, barbs 1630, a cavity 1640, a gap 1650, extensions 1660, a nub 1670, and a base 1680. Base 1680 can have a key 1682 extending downwards from the base 1680. Key 1682 can be inserted into a corresponding slot on a rigid surface so that the clip 1600 can be twisted and locked into place on the rigid surface. In various embodiments, a clip can be free of a key, and can have a planar base, at least one hook extending downwards from the base, or other means for attaching to a seat. The legs are shown with outer base fillets 1622 and inner base fillets 1624. In the embodiment, inner base fillets 1624 can gradually curve into the floor and meet the nub 1670. Nub 1670 can be in the shape of a portion of a disc, or cylinder, extending upwards from the base of the clip 1600.

VI. Clip-to-Wire Stop Clips and Other Arrangements

Figure 17A:
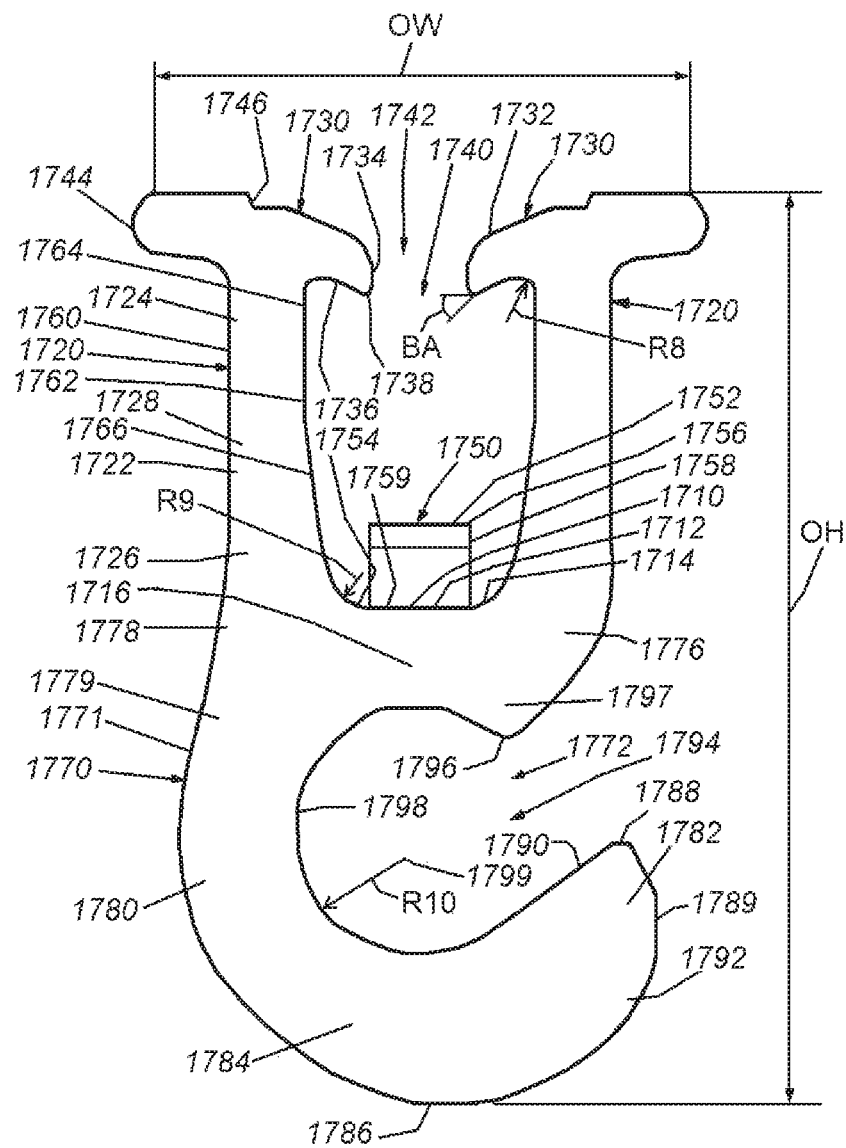
FIG. 17A is a side view of an exemplary clip with a catch, according to an embodiment.

In various embodiments, a foam seat body can have embedded support wires and can be free of embedded clips. Instead of clips being embedded in the foam, the clips can be secured to the embedded wire. An upholstery cover can be secured to the web of a listing, and the listing bead can be inserted into to the wire clip that can be secured to the embedded wire. FIG. 17A is a side view of an exemplary clip-to-wire stop clip with a catch, according to an embodiment. A clip-to-wire stop clip 1700 can include a floor 1710, legs 1720, and barbs 1730. The floor 1710 can be the upper surface of a clip base 1716. The floor 1710, legs 1720, and barbs 1730 can define a cavity 1740. Cavity 1740 can be adapted to hold a listing bead. Legs 1720 can have a thigh 1722 and a calf 1724. The thigh 1722 can be tapered from a thicker region at the lower thigh 1726 to a thinner region at the upper thigh 1728. The calf 1724 can be of uniform thickness (free of taper) between the upper thigh 1728 and the barb 1730. Note that the above-described geometric relationships and dimensions for the barbs, floor and legs are exemplary of a wide range of possible shapes and dimensions.

The two barbs 1730 can define a gap 1742 between the two barbs 1730, so that a listing can pass between the barbs 1730, through the gap 1742, and into the cavity 1740. Barbs 1730 can be directed inwardly and downwardly to capture a listing. A barb 1730 can have a slide 1732 at the top of the barb. The slide 1732 can be angled downwards and inwards towards the gap 1742, so that a listing bead can slide down the slide 1732 and into the gap 1742. A barb can have a barb face 1734 at the inner most portion of the barb 1730. A barb 1730 can have a bottom face 1736 and a hook 1738. Bottom face 1736 and hook 1738 can engage with the listing and hold the listing within the cavity. The bottom face 1736 can be angled inward and downward to capture the listing and prevent the listing from being pulled out. The bottom face 1736 can have a barb angle BA between approximately 20 to 35 degrees from horizontal. A hook 1738 can be a corner between the inner portion of the bottom face 1736 and the lower portion of the barb face 1734. The hook 1738 can make contact with the top of the listing after the listing has been inserted into the cavity 1740, thereby preventing the listing from being pulled out of the cavity 1740. There can be an inner radius R8 between the bottom face 1736 and the leg 1720. The inner radius can strengthen the union of the barb 1730 and the leg 1720, as compared to union with a sharp inner corner. The inner radius R8 can be approximately 0.38 millimeter+/−0.15 millimeter.

The floor 1710 can have a central region 1712 and curved floor sides 1714. The central region 1712 can be flat. The curved floor sides 1714 can be curved upwards to meet the lower thigh 1724. The clip 1700 can have a floor radius R9 between the floor 1710 and the leg 1720. The floor radius R9 can be approximately 0.76 millimeter+/−0.15 millimeter.

The clip 1700 can have extensions 1744 that extend outwardly from the top corners of the clip 1700. The top of the extension 1744 can be approximately horizontal, or parallel with the floor 1710. An extension 1744 can have an extension face 1746 between the top of the extension and the slide 1732. The extension face 1746 can be approximately vertical.

The clip-to-wire stop clip 1700 has a nub 1750 extending into the cavity 1740. Nub 1750 can engage with a corresponding notch in a listing (not shown). The nub 1750 can have an engaging surface 1752 on the outside of the nub 1750. The nub 1750 can be in the shape of a portion of a disc, or cylinder, and the engagement surface 1752 can be the outer circumference of the partial disc or cylinder. The engagement surface 1752 can be a curved plane. The engaging surface 1752 can nestle into the notch, thereby engaging the listing and preventing the listing from sliding within the clip 1700.

The nub 1750 can have two engaging surface unions 1754 where the engaging surface 1752 meets the floor 1710. The engaging surface unions 1754 can be parallel. The engaging surface can have two rims 1756 along the two edges of the engaging surface 1752. Rims 1756 can be parallel to each other, on either side of the engaging surface 1752. The engaging surface can extend from one engaging surface union 1754 to the other engaging surface union 1754 with parallel rims 1756 along the side. The nub 1750 can have nub sides 1758. Nub sides 1758 can meet the engagement surface 1752 at the rims 1758. The nub sides 1758 can be perpendicular to the engagement surface 1752. The nub 1750 can be in the shape of a portion of a disc, or cylinder, engagement surface 1752 can be the outer circumference of the partial disc, and nub sides 1758 can be the planar surfaces that form the ends of the disc. Nub sides 1758 can extend upwards from the floor 1710, and can be approximately vertical. The nub sides can extend upwards from the floor 1710 at side unions 1759. A side union 1759 can be a corner between the nub sides 1758 and the floor 1710. In an embodiment, the nub sides 1758 do not contact the legs 1720. The curved floor sides 1714 can separate the nub sides 1758 from the legs 1720. There can be a nub gap between the nub sides 1758 and the legs 1720. A nub gap can be partially defined by a nub side 1758 and a leg 1720. A nub gap can be partially defined by a nub side 1758, a curved side floor 1714 or a part of the clip base, and a leg 1720. The nub 1750 is pictured as being located on the floor 1710 of the clip 1700 and extending into the cavity 1740, however the nub could be located on a leg 1720 or a barb 1730 and extend into the cavity 1740.

A side union 1759 can have a fillet between the nub side 1758 and the floor 1710. In the alternative, nub sides 1758 can be curved or sloped outwards and downwards to meet the floor 1710, so that the base of the nub 1750 is wider than the top of the nub 1750, when viewed from the side. The nub 1750 can extend upwards from the floor 1710 into the cavity 1740. The nub 1750 is sized and shaped to correspond with a notch in the listing bead. The nub 1750 can have a nub width of approximately 3 millimeters, and can have a nub height of approximately 2-3 millimeters. In various embodiments, one or more nubs 1750 can be located on the floor 1710 and/or on one or more legs 1720, and can extend into the cavity 1740. The location of the at least one nub 1750 corresponds to the location of at least one notch on the listing (not shown).

The legs 1720 can have outer leg sides 1760. Outer leg sides 1760 can be approximately vertical, i.e. approximately 90 degrees. The legs 1720 can have inner leg sides 1782. Inner leg sides 1782 can be approximately vertical at the calf 1724, forming an approximately vertical calf inner side 1764. Inner leg side 1782 can be angled downwards and inwards at the thigh 1722, forming a thigh inner side 1766. The thigh inner side 1766 can be an angle of between approximately 80 and 85 degrees from horizontal between the calf inner side 1764 and the curved floor side 1714. In the alternative, the inner thigh side can be curved and/or angled downwards and inwards in a way that is variable between the calf 1724 and the curved floor side 1714. The thigh inner side 1766 can be curved inwards more sharply (with a smaller radius) at the lower thigh 1726, and can have a decreasing inward angle or curve at the upper thigh 1728 until it is nearly vertical where the thigh inner side 1766 meets the calf inner side 1764.

The cavity 1740 can be partially defined by the approximately vertical calf inner side 1764, an angled thigh inner side 1766, the curved floor side 1714, and the central region 1712 of the floor 1710. The surfaces that partially define the cavity 1740 can be free of corners from one upper thigh 1728 to the floor 1710 to the other upper thigh 1728. The absence of corners where the floor 1710 meets the legs 1720 adds strength to the clip 1700 and can help prevent the legs 1720 from breaking when outward pressure is applied to a leg 1720 from the listing when the listing is pushed through the gap 1742 and the legs are stretched outward to allow the listing to enter the gap. The calf 1724 can be of uniform thickness, and with an approximately vertical outer leg side 1760 and an approximately vertical calf inner side 1764. In the alternative, the cavity 1740 can be partially defined by the approximately vertical calf inner side 1764, and the thigh inner side 1766 that can angle or curve inwards slightly at the upper thigh 1728, and can angle or curve inwards increasingly at the lower thigh 1726 until the thigh inner side 1766 meets the curved floor side 1714 of the floor 1710. The surfaces that partially define the cavity 1740 can be continuously curved from one upper thigh 428 to the floor 1710. The surfaces that partially define the cavity 1740 can be continuously curved from one upper thigh 1728 to the floor 1710 to the other upper thigh 1728. The thigh 1722 can taper from a thinner region at the upper thigh 1728 to an increasingly thicker region at the lower thigh 1726, and can have an inner thigh side 1766 that increasingly angles or curves inwards from the upper thigh 1728 to the lower thigh 1726. The thigh 1722 can be at least partially defined by the outer leg side 1760.

A clip-to-wire stop clip 1700 can have a catch 1770 and a cleft 1772. A catch 1770 can extend from the bottom of the clip base 1716. The clip base 1716 can have a catch side 1774 and a lock side 1776, and the catch 1770 can extend from the catch side 1774 of the base 1716. In the exemplary embodiment of FIG. 17A, the catch side is shown on the left side and the lock side is shown on the right side, however, the catch side could be on the right and the lock side on the left without (free-of) departing from the scope of this disclosure. The catch 1770 can extend from the bottom of the leg 1720 and the bottom of the clip base 1716. The catch 1770 can extend from a lower corner of the leg 1720 and the clip base 1716. The catch 1770 can have a catch root 1778 where the catch extends from the bottom of the leg 1720 and/or the bottom of the clip base 1716. An outer leg side 1760 can extend downwards to the catch 1770, and the catch root 1778 can be where the catch 1770 meets the leg 1720 and the base 1716. A catch root 1778 can be a thicker area of the clip that can add strength to the clip 1700 and prevent the catch 1770 from breaking away from the clip 1700 when the catch 1770 is flexed open to allow the support wire within the seat to pass into the holding area of the catch 1770. The catch can have a catch union 1779 where the outer leg side 1760 meets the outer sidewall 1771 of the catch 1770. The catch union 1779 can be at a bottom corner of the leg 1720 and the base 1716.

A catch 1770 can extend down and away from the catch side 1774 of the clip base 1716 and can extend back upwards towards the lock side 1776 of the clip base 1716. The catch 1770 can have a support arm 1780 that extends downward and can extend outward from the catch side 1774 of the clip base 1716. The catch 1770 can have a holding arm 1782 that can extend upwards from a lower portion of the support arm 1780 towards the lock side 1776 of the clip base 1716. The catch 1770 can have a crosspiece 1784 that can extend inwards from the support arm 1780 and can traverse below the clip base 1716. Crosspiece 1784 can have a leading edge 1786 that can be at the bottom surface of the clip 1700. Leading edge 1786 can be the first portion of the clip that can be pushed into the foam of the seat. The holding arm 1782 can extend upwards from the crosspiece 1784 towards the clip base 1716. Holding arm 1782 can have a lip 1788 and a distal point 1789. Lip 1788 can be the tip of the holding arm 1782. Lip 1788 can be the closest portion of the holding arm 1782 to the clip base 1716. Lip 1788 can be the highest portion of the holding arm 1782, or the portion of the holding arm 1782 that is closest to the barb 1730 on the lock side 1776 of the clip 1700. Distal point 1789 can be the part of the catch 1770 that is farthest to the lock side 1776, that is to say, the portion of the catch 1770 that extends outwards the farthest to the right in FIG. 17A. The holding arm 1782 can have a guide surface 1790 on the inner surface of the holding arm 1782. The holding arm 1782 can have a reinforced area 1792 that can be thicker than other portions of the catch 1770.

The catch 1770 can at least partially define an inner holding area 1794 that can be adapted to hold a support structure, such as a wire, that can be embedded within the foam of a seat. The clip base can optionally have a lock 1796 that can be a locking ridge extending down from the lock side 1776 of the clip base 1716. The lock can have a lock root 1797 where the lock extends from the bottom of the leg 1720 and/or the lock side 1776 of the clip base 1716. The lock root can be a thicker region of the clip 1700. The lock 1796 can at least partially define the holding area 1784. The cleft 1772 can be a passage for the embedded structure in the seat foam, such as a support wire, to pass through the cleft 1772 and into the holding area 1794. The cleft 1772 can be defined by the catch 1770 on one side of the cleft 1772, and the lock 1794 on the other side of the cleft 1772. The cleft 1772 can be defined by the lip 1788 and guide surface 1790 of the catch 1770 on one side of the cleft 1772, and the lock 1796 and/or the lock side 1776 of the base 1716 on the other side of the cleft 1772.

A catch can be in the shape of a partial hoop that can be a portion of an annulus. The inner holding area 1794 can be at least partially defined by a holding area wall 1798 that can define a portion of a circle. The inner holding area 1794 can have a center point 1799 that can be at the center of the inner holding area 1794. Center point 1799 can be approximately centered between the catch side 1774 and the lock side 1776 of the clip 1700, so that the center point 1799 is approximately on the centerline of the clip 1700, or is approximately equidistant from the two barbs 1730. The holding area wall 1798 can have an inner radius R10 of approximately 2.5 millimeters. The clip 1700 can have an overall clip height OH that can be measured from the top of the clip 1700 to the leading edge 1786. The overall clip height OH can be approximately 16-20 millimeters, and preferably approximately 18.5 millimeters. The clip 1700 can have an overall width OW that can be measured from the outer edge of one extension 1744 to the outer edge of the other extension 1744. Overall width OW can be approximately 10-14 millimeters, and preferably approximately 11.8 millimeters. Note that in various embodiments, the overall height OH of the clip can vary based on the application, the location within the seat and the style/type of upholstery—for example, low-profile clips can be used in a thin, firm seat, while taller clips can be used in a thicker, more-cushioned seat.

A support structure, such as a support wire, that can be embedded in the foam of a seat can be held in the holding area 1794 of the catch 1770. Clip 1700 can be fastened to a support wire within the seat by passing the support wire through the cleft 1772 and into the catch 1770. The cleft 1772 can be narrower than the support wire. The catch 1770 can be flexed outwards and open to allow the support wire to pass through the cleft 1772 and into the holding area 1794. After the support wire has passed into the holding area 1794, the catch 1770 can return to the relaxed state that is the original position wherein the cleft is smaller than the support wire. The support wire can be retained within the inner holding area 1794 after passing through the cleft. The lock 1796 that can be a locking ridge can help to hold the support wire in place within the holding area 1794 after the support wire has passed beyond the lock 1796 and into the holding area 1794, and the catch 1770 has returned to its original shape. A locking ridge can be a ridge of material extending down from the base of the clip. Lock 1796 can help to hold the support structure within the holding area 1794, because lock 1796 can extend down from the clip base 1716 to narrow and/or lengthen the cleft 1772. Lock 1796 can help to hold the support structure within the holding area 1794, because lock 1796 can take a portion of any force load exerted by the wire in a pullout direction, thereby reducing the force load on the catch if the wire is pulled towards the cleft from the holding area.

A user can use an upholstery stop clip and a listing bead to apply an upholstery cover onto a seat body. The user can pass a support structure, such as a support wire that is embedded within a seat, through the cleft of the clip-to-wire stop clip, thereby securing the clip-to-wire stop clip to the embedded wire. Passing the support wire through the cleft can flex the catch open enough to allow the support wire to pass through the cleft and into the holding area. After the support wire has entered the holding area, the catch can return to the original position with the support wire held within the holding area. A user can apply an upholstery cover over a seat body by engaging a listing bead within the cavity of at least one clip-to-wire upholstery stop clip. The user can engage a listing bead within a cavity by pressing the bead tip of a listing bead assembly into the gap between the legs of a clip. As the listing bead assembly passes through the gap, the legs can flex outwards to allow the listing bead assembly to pass into the cavity. The user can prevent the listing bead from sliding within the clip by engaging the nub of the clip within the notch of the listing bead. After the listing bead has passed below the barbs, the legs can return to the relaxed shape with a gap that is narrower than the listing bead. The barbs can hold the listing bead within the cavity and prevent the listing bead from pulling out of the cavity. The locking nub can engage with the notch and can prevent the listing bead from moving within the clip. The listing bead of the upholstery cover can be held within the cavity of the clip-to-wire upholstery stop clip, and the support within the seat can be held within the holding area, so that the upholstery cover can be secured over the seat.

Figure 17B:
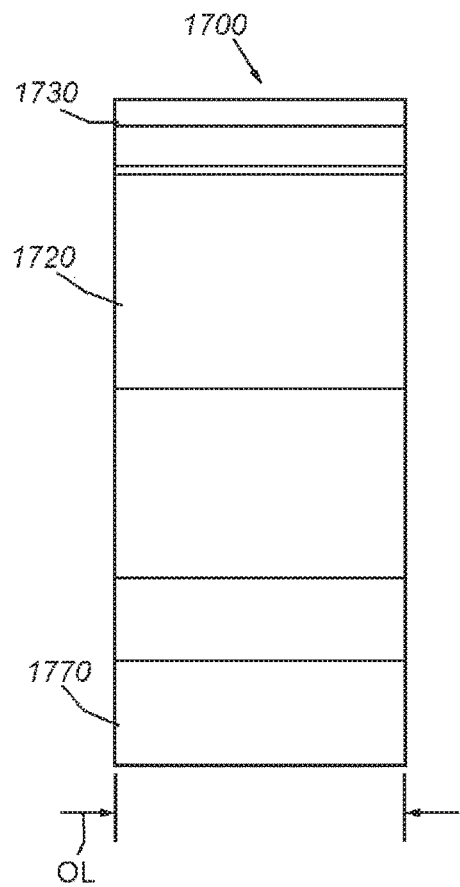
FIG. 17B is a front view of the exemplary clip with a catch of FIG. 17A, according to the embodiment.

FIG. 17B is a front view of the exemplary clip with a catch of FIG. 17A, according to the embodiment. Clip 1700 can have an overall clip length OL that can be measured from the front face to the back face of the clip 1700. Overall clip length OL can be approximately 5-10 millimeters, and preferably approximately 8 millimeters.

Since listing is often a commercially predetermined shape, the clips central region/interior space between the base and barbs must be roomy enough to allow the listing to fully push through the gap, as described below, and become secured against the bottom faces of the barbs. Hence, in this embodiment, the flattened barb bottom faces are oriented at a specific angle AB between approximately 20 to 35 degrees with an illustrative value of 29 degrees, which approximately matches the of the top, barb-engaging walls of the listing bead. In general, the depicted design allows for a desirable pullout-to-push-in performance. Thus more strength is needed to pull the listing out of a clip than to push it in, thereby rendering the performance of the illustrative design highly effective.

Figure 18A:
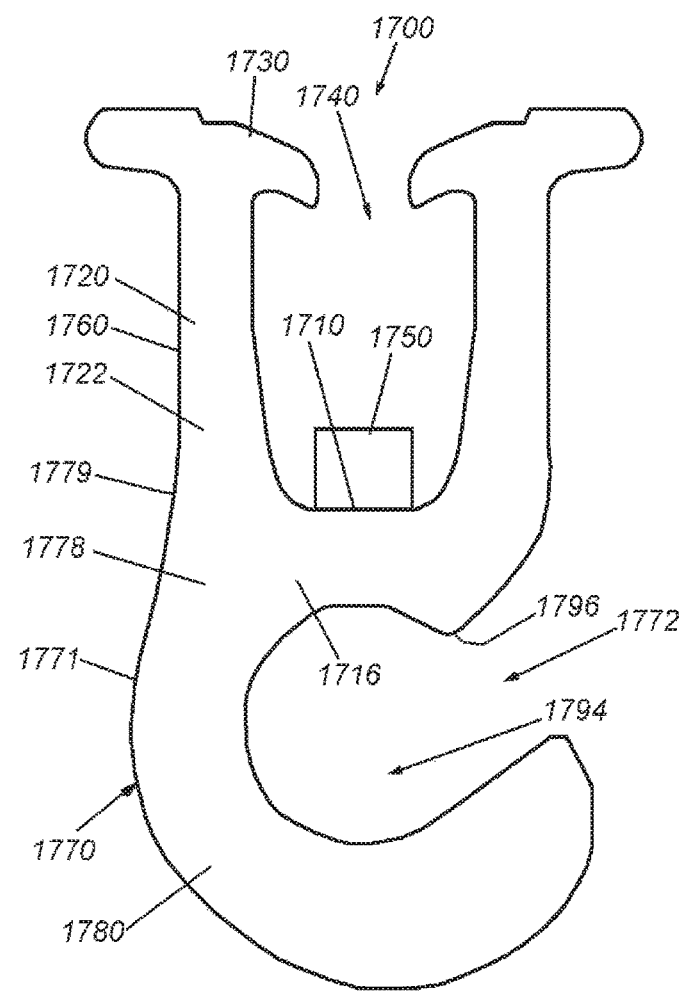
FIG. 18A is a side view of an exemplary clip with a catch having a support arm that extends from the thigh, according to an embodiment.

FIG. 18A is a side view of an exemplary clip with a catch having a support arm that extends from the thigh, according to an embodiment. The clip 1700 can have legs 1720 and a catch 1770. The catch 1770 can have a support arm 1780 that extends downwards and can extend outwards from the leg 1720 and the bottom of the clip base 1716. The catch can have a catch root 1778 where the catch 1770 extends from the leg 1720 and the bottom of the clip base 1716. Support arm 1780 can have an outer wall 1771 that can extend upwards to meet the outer leg side 1760 at the thigh 1722. The catch 1770 can have a catch union 1779 where the sidewall 1771 meets the outer leg 1760 at the thigh 1722. Having the catch union 1779 at the thigh 1722 can result in a thicker catch root 1778, and a thicker catch root 1778 can be stronger and more resistant to breakage so that the catch 1770 can be stronger under larger loads. However, turning to FIGS. 17A and 18, having the catch union 1779 at the clip base 1716 and having a smaller catch root 1778 can allow the catch 1770 to flex open easier which can allow the support wire to be passed into the holding area 1794 easier.

Figure 18B:
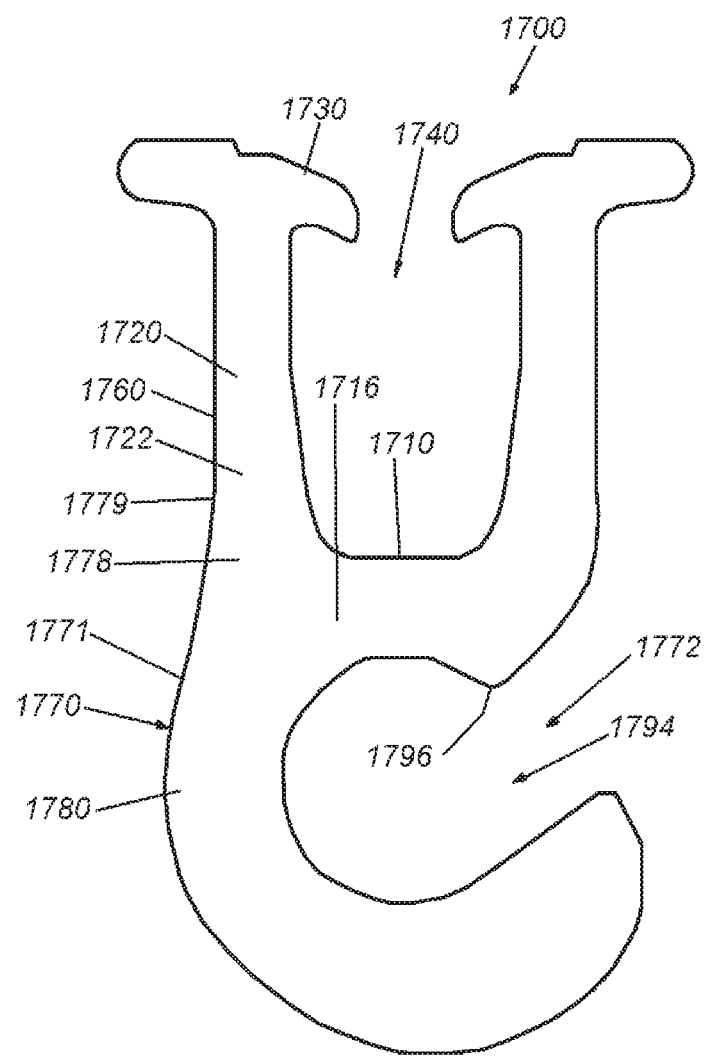
FIG. 18B is a side view of the exemplary clip of FIG. 18B without (free-of) a stop nub, according to an embodiment.

FIG. 18B is a side view of the exemplary clip of FIG. 18B without (free-of) a stop nub, according to an embodiment. As shown in FIG. 18B, the clip-to-wire clip can be free of a stop nub. The clip shown in FIG. 18B can be used, for example, to secure a seat cover with a listing bead that does not have a notch for a nub.

Figure 19:
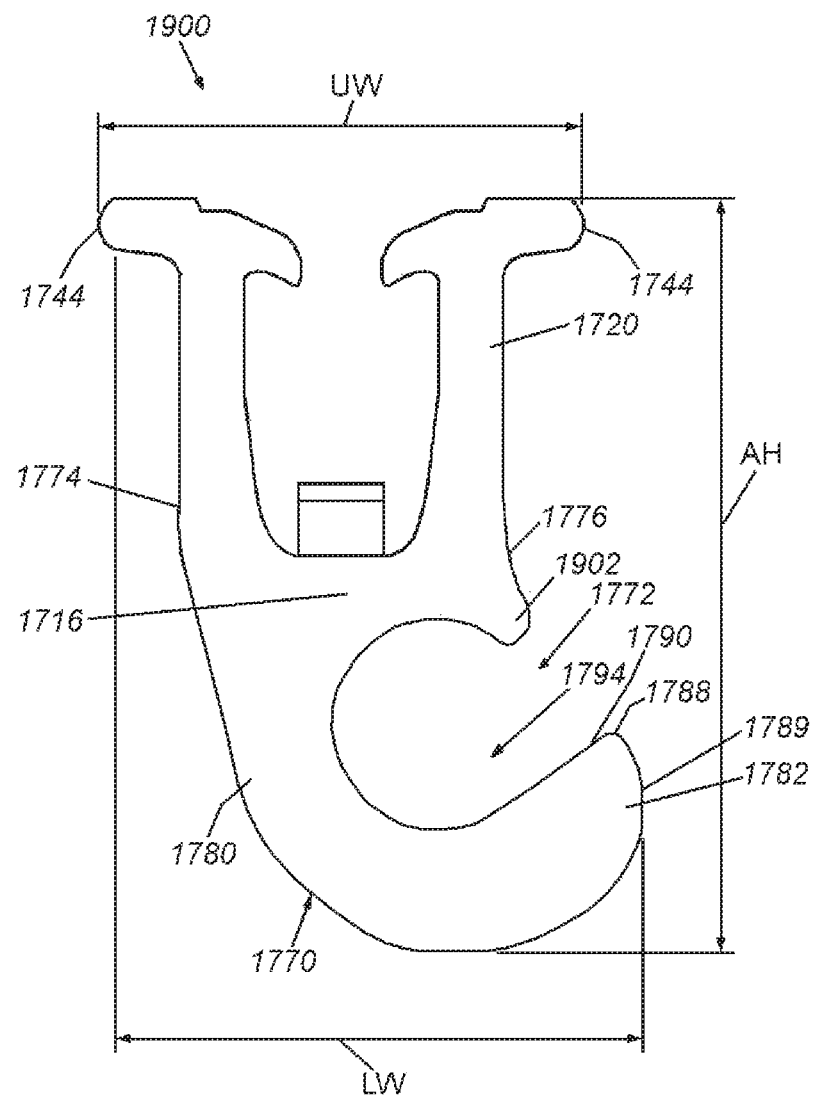
FIG. 19 is a side view of an exemplary clip with catch having an offset holding area, according to an embodiment.

FIG. 19 is a side view of exemplary clip with catch having an offset holding area, according to an embodiment. In various embodiments, the clip 1900 can have a holding area 1794 that can be offset from the center of the clip 1900. The center point 1799 of the holding area 1794 can be offset towards the lock side 1776 of the clip 1900. The catch 1700 can have a support arm 1780 that extends downward and can extend inward from the catch side 1774 of the clip base 1716. The catch can have a holding arm 1782 that can extend outward beyond the lock side 1776 of the clip base 1716. The lip 1788 of the holding arm 1782 can be located beyond the lock side 1776 of the clip base 1716, so that the lip 1788 is not directly below the clip base 1716 or the clip leg 1720. The holding arm 1782 can have a distal point 1789. Distal point 1789 can be the part of the catch 1770 that is farthest to the lock side 1776, that is to say, the portion of the catch 1770 that extends outwards the farthest to the right in FIG. 19. In an embodiment, distal point 1789 can also be the part of the clip 1700 that is farthest to the lock side 1776, that is to say, the portion of the clip 1900 that extends outwards the farthest to the right in FIG. 19.

Clip 1900 can have a lock 1902 that can protrude downwards and outwards towards the guide surface 1790. The lock 1902 can protrude towards the guide surface 1790 so that the cleft 1772 between the lock 1902 and the guide surface 1790 can be narrower than the support wire. In various embodiments, the holding arm 1782 and the lock 1902 can extend outward various distances to the right, and the holding arm 1782 and the lock 1902 can form a cleft 1772 at the opening of the holding area 1794 that can be narrower than the support wire, however, the distance the holding arm 1782 and the lock 1902 extend outward to the right, and the width of the cleft 1772, can vary in different applications. In various embodiments, an embedded wire can be approximately 4-6 millimeters, and the holding area 1794 can be sized to accommodate the wire and the cleft 1772 can be slightly smaller than the wire.

Clip 1900 with an offset holding area can have an overall clip height AH that can be measured from the top of the barb to the bottom of the catch 1770. Overall clip height AH can be approximately 16-20 millimeters, and preferably approximately 18.3 millimeters. Clip 1900 can have an upper width UW that can be measured as the distance between the outer ends of the two extensions 1744. Upper width UW can be approximately 10-14 millimeters, and preferably approximately 11.8 millimeters. Clip 1900 can have a catch width LW that can be measured as the lateral distance between an upper extension 1744 and the distal point 1789 of the holding arm 1782. Catch width LW can be approximately 11-15 millimeters, and preferably approximately 12.3 millimeters.

Figure 20A:
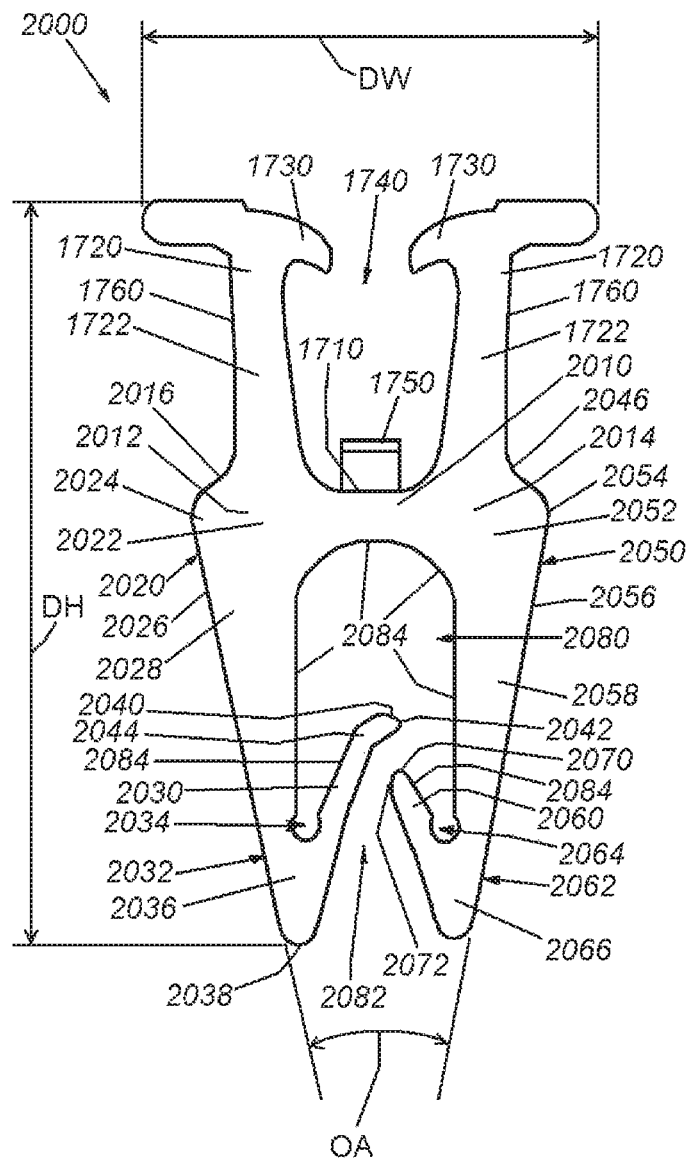
FIG. 20A is a side view of an exemplary clip with a catch and a lock arm, according to an embodiment.

FIG. 20A is a side view of an exemplary clip with a catch and a lock arm, according to an embodiment. Clip 2000 can include a floor 1710, legs 1720, barbs 1730, and a cavity 1740. Clip 2000 can include a nub 1750 extending into the cavity 1740. Floor 1710 can be the upper surface of a clip base 2010. Clip 2000 can include a catch 2020 and a lock 2050, and the clip base 2010 can have a catch side 2012 and a lock side 2014. In the exemplary embodiment of FIG. 20, the catch side is shown on the left side and the lock side is shown on the right side, however, the catch side could be on the right and the lock side on the left without (free-of) departing from the scope of this disclosure. The catch 2020 can extend from the catch side 2012 of the clip base 2010. The catch 2020 can extend from the bottom of the leg 1720 and the bottom of the clip base 2010. The catch 2020 can extend from the lower corner of the leg 1720 the clip base 2010.

The catch 2020 can have a catch root 2022 where the catch extends from the bottom of the leg 1720 and/or the catch side 2012 of the clip base 2010. An outer leg side 1760 can extend downwards to the catch 2020, and the catch root 2022 can be where the catch 2020 meets the leg 1720 and the base 2010. The catch can extend outward and/or downward from the catch root 2022. The catch 2020 can have a shoulder 2024. A shoulder 2024 can extend from the catch side 2012 of the clip 2020 at the catch root 2022. The shoulder 2024 can increase the size and strength of the catch root 2022. The shoulder 2024 can thicken the connection between the catch 2020 and the base 2010 so that the catch 2020 can be less prone to breakage. The catch can have an outer sidewall 2026 and a catch union 2016 where the outer leg side 1760 meets the outer sidewall 2026 of the catch 2020. The catch union 2016 can be on the outside of the thigh 1722 of the leg 1720.

The catch 2020 can extend down and away from the catch side 2012 of the clip base 2010 and can at least partially define a holding area 2080. The catch 2020 can have a support arm 2028 that extends downward and can extend outward from the catch side 2012 of the clip base 2010. The catch can have a holding arm 2030 that can extend upwards from a lower portion of the support arm 2028 towards the lock side 2014 of the clip base 2010. The catch 2020 can have a joint 2032 between the support arm 2028 and the holding arm 2030.

Joint 2032 can have a spring area 2034. Spring area 2034 can be an area of reduced thickness of the support arm 2032, joint 2032, and/or the holding arm 2030. The spring area can be in the form of an area of omitted material that can be approximately shaped like a portion of a circle. The spring area can be a channel within the catch at the joint, so that the channel extends along a z-axis into the page from the front of the clip to the rear of the clip. The channel of the spring area can be defined by a semicircular, or semi-cylindrical wall. The approximately circle shaped area of omitted material can be centered where the inner surface of the support arm 2028 and the inner surface of the holding arm 2030 come together at the joint 2032. The spring area 2034 that can have an area of omitted material can have a reduced flexing strength due to the omitted material, so that the holding arm 2030 can flex towards the support arm 2028 more easily. This reduced flexing strength that allows the holding arm 2030 to flex towards the support arm more easily can allow the support structure within the foam seat, such as a support wire, to more easily pass through the cleft and into the holding area 2080 of the catch 2020.

Joint 2032 can have a strengthening knuckle 2036. The strengthening knuckle 2036 can be an area of material that can extend downwards as part of the joint 2032. The strengthening knuckle 2036 can be in the shape of an acute angle that can be an extension of the outer sides of the support arm 2028 and the holding arm 2030. The strengthening knuckle 2036 can provide increased extending strength to the holding arm 2030 due to the additional material forming the joint 2032, so that the holding arm 2030 is strengthened from breakage when the holding arm 2030 is extended away from the support arm 2028. Catch 2020 can have a leading edge 2038 that can be at the bottom of the clip 2000. The leading edge 2038 can be the lowest portion of the strengthening knuckle 2036. Holding arm 2030 can have a lip 2040 and a distal point 2042. Lip 2040 can be the tip of the holding arm 2030. Lip 2040 can be the closest portion of the holding arm 2030 to the clip base 2010. Lip 2040 can be the highest portion of the holding arm 2030, or the portion of the holding arm 2030 that is closest to the barb 1730 on the lock side 2014 of the clip 2000. Distal point 2042 can be the part of the catch 2020 that is farthest to the lock side 2014, that is to say, the portion of the catch 2020 that extends outwards the farthest to the right in FIG. 20A. The holding arm 2030 can have a curved tip 2044 that can be a portion of the distal end of the holding arm 2030 near the distal point 2042, explained more fully below.

The catch 2020 can at least partially define an inner holding area 2080 that can be adapted to hold a support structure, such as a wire, that can be embedded within the foam of a seat. The clip 2000 can also have a lock 2050 that can partially define the inner holding area 2080. Lock 2050 can have a lock root 2052 where the lock extends from the bottom of the leg 1720 and/or the lock side 2014 of the clip base 2010. The lock root 2052 can be a thicker region of the clip 2000 at the base of the lock 2050. An outer leg side 1760 can extend downwards to the lock 2050, and the lock root 2052 can be where the lock 2050 meets the leg 1720 and the base 2010. The lock can extend outward and/or downward from the lock root 2052. The lock 2050 can have a shoulder 2054. A shoulder 2054 can extend from the lock side 2014 of the clip 2020 at the lock root 2052. The shoulder 2054 can increase the size and strength of the lock root 2052. The shoulder 2054 can thicken the connection between the lock 2050 and the base 2010 so that the lock 2050 can be less prone to breakage. The lock can have an outer sidewall 2056 and a lock union 2046 where the outer leg side 1760 meets the outer sidewall 2056 of the lock 2050. The lock union 2056 can be on the outside of the thigh 1722 of the leg 1720.

The lock 2050 can extend down and away from the lock side 2014 of the clip base 2010 and can at least partially define a holding area 2080. The lock 2050 can have a support arm 2058 that extends downward and can extend outward from the lock side 2014 of the clip base 2010. The lock 2050 can have a locking arm 2060 that can extend upwards towards the catch side 2012 of the clip base 2010. The lock 2050 can have a joint 2062 between the support arm 2058 and the locking arm 2060.

Joint 2062 can have a spring area 2064. Spring area 2064 can be an area of reduced thickness of the support arm 2062, joint 2064, and/or the locking arm 2060. The spring area 2064 can be in the form of an area of omitted material that can be approximately shaped like a portion of a circle. The spring area can be a channel within the catch at the joint, so that the channel extends along a z-axis into the page from the front of the clip to the rear of the clip. The channel of the spring area can be defined by a semicircular, or semi-cylindrical wall. The approximately circle shaped area of omitted material can be centered where the inner surface of the support arm 2058 and the inner surface of the locking arm 2060 come together at the joint 2062. The spring area 2064 that can have an area of omitted material can have a reduced flexing strength due to the omitted material, so that the locking arm 2060 can flex towards the support arm 2058 more easily. This reduced flexing strength that allows the locking arm 2060 to flex towards the support arm 2058 more easily can allow the support structure within the foam seat, such as a support wire, to more easily pass into the holding area 2080 of the catch 2020.

Joint 2062 can have a strengthening knuckle 2066. The strengthening knuckle 2066 can be an area of material that can extend downwards as part of the joint 2062. The strengthening knuckle 2066 can be in the shape of an acute angle that can be an extension of the outer sides of the support arm 2058 and the locking arm 2060. The strengthening knuckle 2066 can have increased extending strength due to the additional material forming the joint 2062, so that the locking arm 2060 is strengthened from breakage when the locking arm 2060 is extended away from the support arm 2058. Joint 2062 can have a leading edge 2068 that can be at the bottom of the clip 2000. The leading edge 2068 can be the lowest portion of the strengthening knuckle 2066. Locking arm 2060 can have a lip 2070 and a distal point 2072. Lip 2070 can be the tip of the holding arm 2060. Lip 2070 can be the closest portion of the locking arm 2060 to the clip base 2010. Lip 2070 can be the highest portion of the locking arm 2060, or the portion of the locking arm 2060 that is closest to the barb 1730 on the catch side 2012 of the clip 2000. Distal point 2072 can be the part of the lock 2050 that is farthest to the catch side 2012, that is to say, the portion of the lock 2050 that extends outwards the farthest to the left in FIG. 20A.

The catch 2020 and the lock 2050 can at least partially define an inner holding area 2080 that can be adapted to hold a support structure, such as a wire, that can be embedded within the foam of a seat. The clip can have a cleft 2082 that can be a passage for the embedded structure in the seat foam, such as a support wire, to pass through the cleft 2082 and into the holding area 2080. The support wire can be retained within the inner holding area 2080 after passing through the cleft. 2082. The cleft 2082 can be defined by the catch 2020 on one side of the cleft, and the lock 2050 on the other side of the cleft 2082. The cleft 2082 can be defined by the holding arm 2030 of the catch 2020 on one side of the cleft 2082 and the locking arm 2060 of the lock 2050 of the r on the other side of the cleft 2082. The cleft 2082 can be narrower than the support wire, however, the cleft can flex to allow the support wire to pass through the cleft 2082. When a user pushes the clip 2000 onto a support structure such as a wire within the seat, the wire can pass between the two support knuckles and can press against the holding arm 2030 and the locking arm 2060. The spring areas 2034 and 2064 can allow the locking arm 2060 and/or the holding arm 2030 to flex towards their respective support arms 2028 and 2058 under the pressure more easily, so that the support wire can push the holding arm 2030 and locking arm 2060 aside and pass through the cleft 2082 and into the holding area 2080. After the support wire has entered the holding area 2080, the catch 2020 and the lock 2050 can return to their original shape in the relaxed position so that the cleft 2082 can be narrower than the support wire and the support wire can be retained within the holding area 2080. The locking arm 2060 of lock 2050 can help to hold the support structure within the holding area 2080 because locking arm 2060 can narrow the cleft 2082.

The holding area 2080 can be approximately centered along the center of the clip, which is to say, the holding area 2080 can be approximately centered between the catch side 2012 and the lock side 2014, or can be approximately equidistant from the two barbs 1730. The holding area 2080 can be defined by holding area walls 2084. The holding area walls 2084 can include the inner surface of the catch 2020 and the inner surface of the lock 2050. The holding area walls 2084 can include the inner surfaces of the holding arm 2030 and the support arm 2028 of the catch 2020, the lower surface of the base 2010, and the inner surfaces of the support arm 2058 and the locking arm 2060 of the lock 2050.

After the wire has been pressed into the holding area 2080, any force exerted on the clip in the opposite direction, that is to say, in the direction of pullout or disengagement, can result in the wire exerting force against the inner surface of the holding arm 2030. Because of the geometry of the catch 2020, the force of the wire can be against the holding arm 2030, and the wire can slide down the holding arm 2030 towards the spring area 2034. The additional material of strengthening knuckle 2036 that extends below the spring area can give strength to the holding arm so that the holding arm can have increased resistance to being extended away from the support arm 2028. The additional material of strengthening knuckle 2036 can help to prevent the holding arm 2030 from breaking off under the force exerted on the holding arm from the support wire within the holding area 2080. The holding arm 2030 can extend slightly under the force until the outer surface of the holding arm 2030 can rest against the lip 2070 of the locking arm 2060. The locking arm 2060 can take a portion of the force load to help hold the wire within the holding area 2080 and prevent breakage of the holding arm 2030. The holding arm can have a curved end 2044, so that the holding arm can curve slightly around the lip 2070 of the locking arm 2060 and lay against the locking arm 2060. The locking arm 2050 can have a strengthening knuckle 2066, and the additional material of strengthening knuckle 2066 that extends below the spring area 2064 can give strength to the locking arm 2060 so that the locking arm can have increased resistance to being extended away from the support arm 2068. The additional material of strengthening knuckle 2066 can help to prevent the locking arm 2060 from breaking off under the force exerted on the locking arm 2060 from the holding arm 2030 when the support wire exerts force on the holding arm 2030. The holding arm 2030, including the curved end 2044, can effectively form a floor of the holding area 2080, which can prevent the support wire from reaching the locking arm of the cleft. Because the support wire can exert force against the holding arm, but cannot exert force directly against the locking arm, the support wire is effectively held by both the holding arm and the locking arm underneath so that the force load can be split between the catch 2020 and the lock 2050, thereby increasing the strength of the clip and decreasing the possibility of breakage. The shoulders 2024 and 2054 can also add strength that can prevent the catch 2020 or lock 2050 from breaking away from the clip. Similar to the strengthening knuckles, the additional material of the shoulders at the roots can give additional strength to the catch 2020 and the lock 2050 which can help to prevent the catch 2020 and/or lock 2050 from breaking away from the clip 2000. The additional material of the shoulders 2024 and 2054 can give additional strength to the clip legs 1720 which can help to prevent the clip legs 1720 from breaking away from the clip 2000. A user can engage the listing bead of an upholstery cover within the cavity 1740 between the legs 1720, and the support wire can be engaged within the inner holding area 2080, so that the upholstery cover can be secured to the foam seat in an efficient manner and can resist breakage.

A user can apply an upholstery cover over a seat body by engaging a listing bead within the cavity 1740 of at least one upholstery clip. The user can pass a support structure, such as a support wire that is embedded within a seat, through the cleft of the clip. Passing the support wire through the cleft can flex the catch open enough to allow the support wire to pass through the cleft and into the holding area. The catch can flex open by flexing the holding arm towards the support arm, and the catch can flex open by flexing the support arm outwards. After the support wire has entered the holding area, the catch can return to the original position with the support wire held within the holding area. The listing bead of the upholstery cover can be held within the cavity, and the support within the seat can be held within the holding area, so that the upholstery cover can be secured over the seat.

Figure 20B:
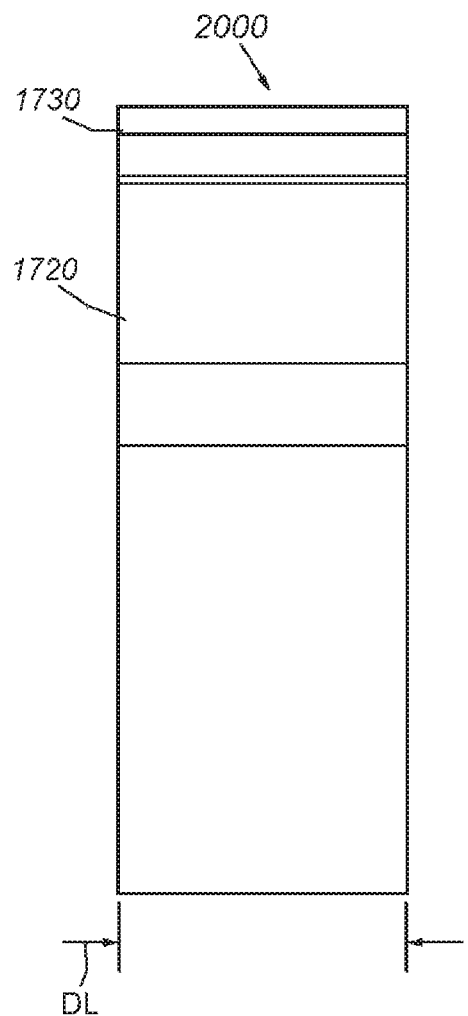
FIG. 20B is a front view of the exemplary clip with a catch and a lock arm of FIG. 20A, according to the embodiment.

Clip 2000 can have an overall clip width DW that can be measured as the distance between the outer ends of the two extensions 1744. Clip width DW can be approximately 11-15 millimeters, and preferably approximately 13 millimeters. Clip 2000 can have an overall clip height DH that can be measured from the top of the barbs 1730 to the bottom of the catch 2020. Overall clip height DH can be approximately 20-24 millimeters, and preferably approximately 21.5 millimeters. Overall clip height DH can be approximately 22.3 millimeters. FIG. 20B is a front view of the exemplary clip with a catch and a lock arm of FIG. 20A, according to the embodiment. Clip 2000 can have an overall clip length DL that can be measured from the front face to the back face of the clip 2000. Overall clip length DL can be approximately 5-10 millimeters, and preferably approximately 8 millimeters. The outer sidewall 2026 of the catch and the outer sidewall 2056 of the lock can form an outer angle OA. Outer angle OA can be approximately 21-23 degrees.

VII. Clip-to-Wire Stop Clips Securing Upholstery

Figure 21A:
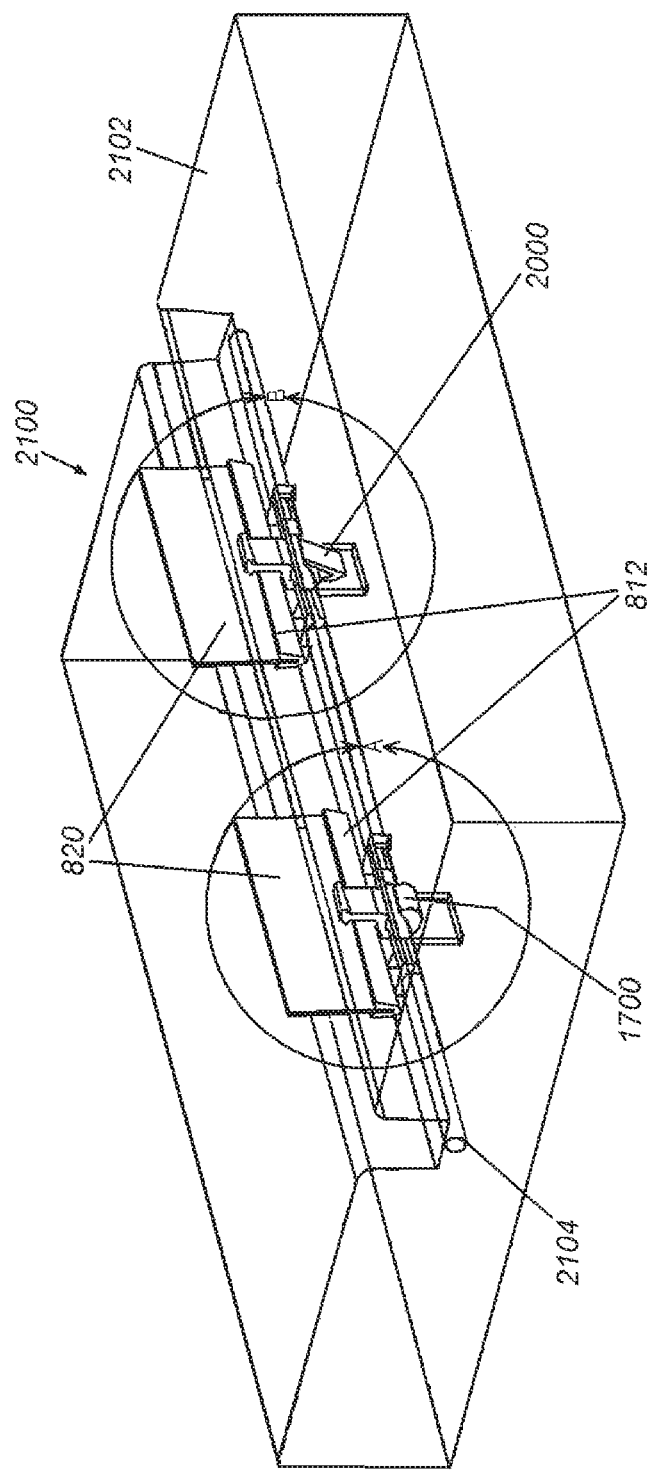
FIG. 21A is a perspective view of clip-to-wire stop clips securing an upholstery cover in a seat, according to an embodiment.

FIG. 21A is a perspective view of clip-to-wire stop clips securing an upholstery cover in a seat, according to an embodiment. A seat 2100 can have a foam seat body 2102, shown in phantom in FIG. 21. The foam seat body can have at least one embedded support structure such as wire 2104. Clip-to-wire stop clips, such as clip 1700 and clip 2000, can be secured to the embedded wire 2104 by passing the support wire into the holding area, as described above. A web 820 of a listing assembly can be attached to a seat cover. The upholstery cover can be secured to the foam seat by engaging the listing bead 812 within the cavity of a clip-to-wire stop clip secured to the wire 2104 embedded within the foam seat body 2102. The nubs of the stop clips 1700 and 2000 can be engaged with notches in the listing bead 812 so that the listing bead is prevented from moving within the stop clips, and the seat cover (not shown) is secured to the foam seat body so that it cannot move in any direction. A single clip-to-wire stop clip can prevent the listing bead from moving in any direction relative to the clip.

Figure 21B:
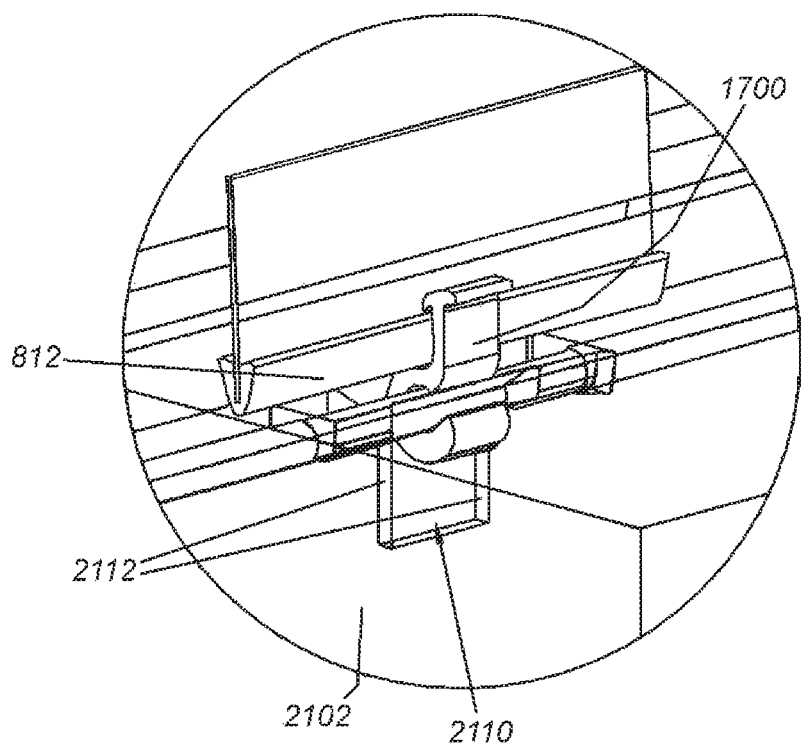
FIG. 21B is a detailed perspective view of the stop clip of FIG. 17A securing an upholstery cover in a seat, as shown in FIG. 21A.
Figure 21C:
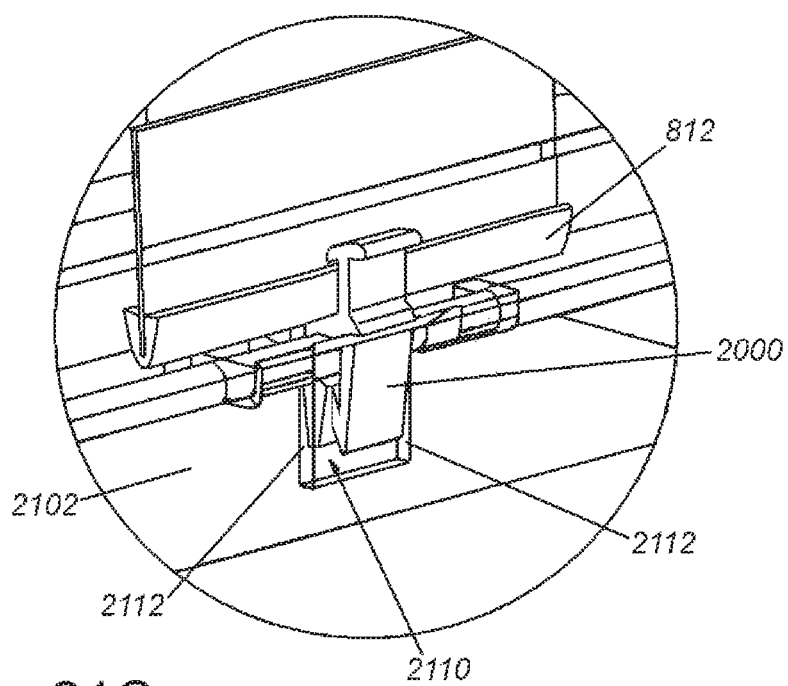
FIG. 21C is a detailed perspective view of the stop clip of FIG. 20A securing an upholstery cover in a seat, as shown in FIG. 21A.

FIG. 21B is a detailed perspective view of the stop clip of FIG. 17A securing an upholstery cover in a seat, as shown in FIG. 21A, and FIG. 21C is a detailed perspective view of the stop clip of FIG. 20A securing an upholstery cover in a seat, as shown in FIG. 21A. As shown, the foam seat body 2102 can have an opening or gap 2110 in the foam that can be sized and shaped to accommodate the clip-to-wire stop clip. The gap 2110 can have sidewalls 2112, and the foam on the sides of the gap forming the sidewalls 2112 can prevent the clip from sliding along the wire, so that the clip is secured in place relative to the foam seat body 2102. With the clip secured in place relative to the foam seat body, and the listing bead secured in place relative to the clip, the seat cover is thereby secured in place relative to the foam seat body.

Figure 20C:
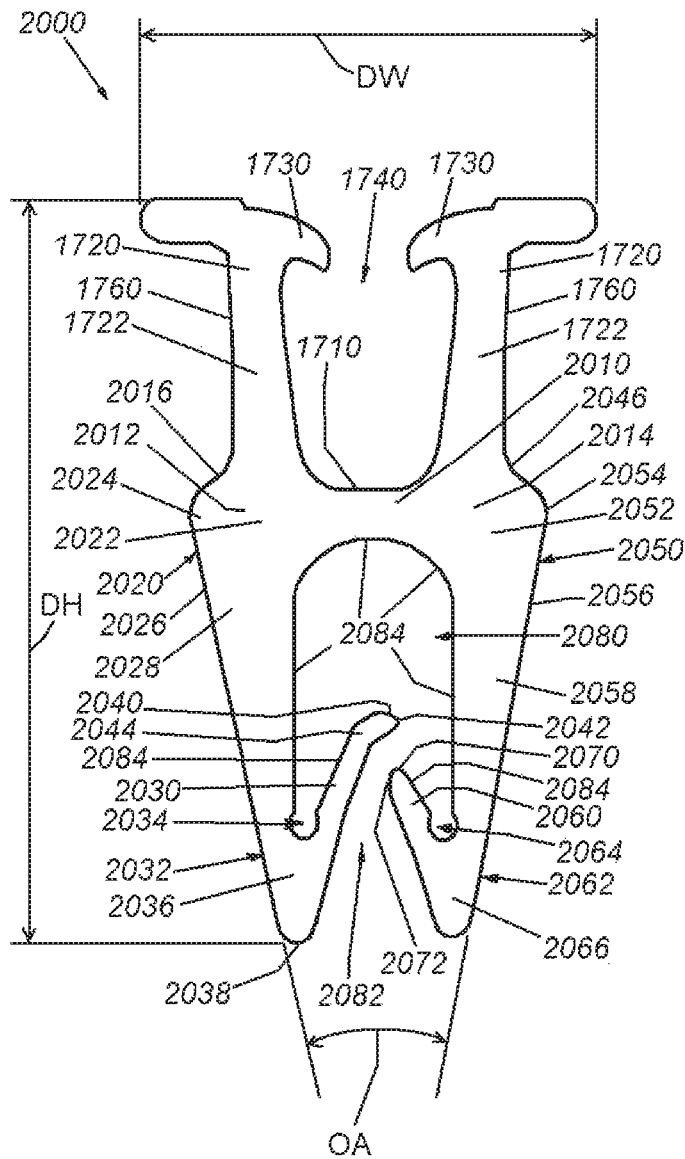
FIG. 20C is a front view of the exemplary clip of FIG. 20A without (free-of) a support nub, according to an embodiment.

FIG. 20C is a front view of the exemplary clip of FIG. 20A without (free-of) a stop nub, according to an embodiment. As shown in FIG. 20C, the clip-to-wire clip can be free of a stop nub. The clip shown in FIG. 20C can be used, for example, to secure a seat cover with a listing bead that does not have a notch for a nub.

VIII. Conclusion

It should be clear that the above-described embodiment provide an effective mechanism for preventing longitudinal movement of a listing bead and associated upholstery cover with respect to a foam substrate. The stop clips described herein are relatively straightforward to manufacture and attach in seat assembly. They potentially lend themselves to various uses, including foam-embedded arrangements ad clip-to-(embedded) wire arrangements. Certain clip-to-wire geometries also have broader applicability beyond the stop-clip implementation, and can be used as conventional listing clips with or without (free-of) surrounding stop clips.

It should be clear that the above-described locking systems provide a secure attachment for a listing bead within a stop clip that prevents the listing bead from moving freely in any direction, while still maintaining the structural integrity of the listing bead. In particular, it should be clear that the clip design herein can be installed at any location, as well as multiple locations, along a listing, and it is mounting location is neither contemplated to be, nor limited to, an end location to achieve desirable results and/or performance.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, a stop clip can have no structures extending from the base, or a variety of various bases, including by not limited to, a flat planar base, a hooked base, a base with a catch, a base with a locking key, or other possibilities. A clip can have various additional features such as a means for engaging a tool with the side of a catch so that a user can flex the catch outwards and open to release a support wire. As used herein various directional and orientational terms such as "vertical", "horizontal", "up", "down", "bottom", "top", "side", "front", "rear", "left", "right", and the like, are used only as relative conventions and not as absolute orientations with respect to a fixed coordinate space or system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A locking stop clip comprising:
   a base;
   a pair of legs extending upwards from the base;
   a barb at an end region of each leg, wherein the base, the legs, and the barbs partially define a central cavity; and
   a nub extending from the clip into the central cavity, the nub having an upper engaging surface that is a curved surface, and the nub having two surface unions where the engaging surface meets the base at opposite ends of the curved surface, wherein the two surface unions are perpendicular to a front-to-back direction of the leg and are in between the legs.

2. The locking stop clip of claim 1, wherein the nub a shape defined thereby that is a portion of a disc.

3. The locking stop clip of claim 1, wherein the nub extends upwards from the base, and wherein the nub and the leg define a nub gap between the nub and the leg, whereby the nub and the leg are free of contact between the nub and the leg.

4. The locking stop clip of claim 2, wherein the nub has at least one nub side.

5. The locking stop clip of claim 1, wherein a top portion of the nub is free of contact with the legs.

6. A locking stop clip comprising:
a base;
a pair of legs extending upwards from the base;
a barb at an end region of each leg, wherein the base, the legs, and the barbs partially define a central cavity; and
a nub extending from the clip into the central cavity, the nub having an upper engaging surface that is a curved plane, the upper engaging surface having a top portion that defines an apex along a top of the upper engaging surface, wherein the apex is perpendicular to a front-to-back direction of the legs and is in between the legs.

7. The locking stop clip of claim 6, wherein the nub a shape defined thereby that is a portion of a disc.

8. The locking stop clip of claim 6, wherein the nub extends upwards from the base, and wherein the nub and the leg define a nub gap between the nub and the leg, whereby the nub and the leg are free of contact between the nub and the leg.

9. The locking stop clip of claim 7, wherein the nub has at least one of (a) an upper surface that is a curved plane that touches the base at two opposite ends of the curved plane, and (b) at least one nub side.

10. The locking stop clip of claim 6, wherein a top portion of the nub is free of contact with the legs.

11. A locking stop clip comprising:
a base;
a pair of legs extending upwards from the base;
a barb at an end region of each leg, wherein the base, the legs, and the barbs partially define a central cavity; and
a nub extending from the clip into the central cavity, the nub having an upper engaging surface that is a curved surface, the upper engaging surface having a top portion that defines an apex along a top of the upper engaging surface, and the nub having two surface unions where the upper engaging surface meets the base at opposite ends of the curved surface, wherein a plane bisecting the clip and parallel to, and in between, the legs connects both surface unions and the top portion.

12. The locking stop clip of claim 11, wherein the nub a shape defined thereby that is a portion of a disc.

13. The locking stop clip of claim 11, wherein the nub extends upwards from the base, and wherein the nub and the leg define a nub gap between the nub and the leg, whereby the nub and the leg are free of contact between the nub and the leg.

14. The locking stop clip of claim 12, wherein the nub has at least one nub side.

15. The locking stop clip of claim 11, wherein a top portion of the nub is free of contact with the legs.

16. A locking stop clip comprising:
a base;
a pair of legs extending upwards from the base;
a barb at an end region of each leg, wherein the base, the legs, and the barbs partially define a central cavity; and
a nub extending from the clip into the central cavity, the nub having an upper engaging surface that is a curved plane, the upper engaging surface having a top portion that defines an apex along a top of the upper engaging surface, wherein a line along the apex would extend to both of the legs.

17. The locking stop clip of claim 16, wherein the nub a shape defined thereby that is a portion of a disc.

18. The locking stop clip of claim 16, wherein the nub extends upwards from the base, and wherein the nub and the leg define a nub gap between the nub and the leg, whereby the nub and the leg are free of contact between the nub and the leg.

19. The locking stop clip of claim 17, wherein the nub has at least one of (a) an upper surface that is a curved plane that touches the base at two opposite ends of the curved plane, and (b) at least one nub side.

20. The locking stop clip of claim 16, wherein a top portion of the nub is free of contact with the legs.

* * * * *